United States Patent
Ginger et al.

(10) Patent No.: US 8,686,358 B2
(45) Date of Patent: Apr. 1, 2014

(54) SUB-MICROSECOND-RESOLUTION PROBE MICROSCOPY

(75) Inventors: David Ginger, Seattle, WA (US); Rajiv Giridharagopal, Seattle, WA (US); David Moore, Seattle, WA (US); Glennis Rayermann, Seattle, WA (US); Obadiah Reid, Denver, CO (US)

(73) Assignee: University of Washington through its Center for Commercialization, Seattle, WA (US)

(*) Notice: Subject to any disclaimer, the term of this patent is extended or adjusted under 35 U.S.C. 154(b) by 254 days.

(21) Appl. No.: 13/232,859

(22) Filed: Sep. 14, 2011

(65) Prior Publication Data

US 2012/0079630 A1 Mar. 29, 2012

Related U.S. Application Data

(60) Provisional application No. 61/382,804, filed on Sep. 14, 2010.

(51) Int. Cl.
*G01Q 10/00* (2010.01)
*G01Q 60/24* (2010.01)
*G01B 5/28* (2006.01)

(52) U.S. Cl.
USPC ............... 250/306; 250/307; 73/104; 73/105; 850/1; 850/5; 850/8; 850/33; 324/456; 324/458; 324/754.01; 324/754.03

(58) Field of Classification Search
USPC ............ 250/306, 307; 850/1, 5, 8, 10, 33, 40, 850/52, 63; 73/104, 105, 504.12, 504.15; 324/456, 458, 537, 676, 681, 683, 324/754.01, 754.03
See application file for complete search history.

(56) References Cited

U.S. PATENT DOCUMENTS

| | | | | |
|---|---|---|---|---|
| 5,959,447 | A * | 9/1999 | Bridges et al. | 324/755.07 |
| 6,133,742 | A * | 10/2000 | Bridges et al. | 324/676 |
| 7,464,583 | B1 * | 12/2008 | Kowalewski et al. | 73/105 |
| 7,487,667 | B2 * | 2/2009 | Matsumoto et al. | 73/105 |
| 7,874,202 | B2 * | 1/2011 | Matsumoto et al. | 73/105 |
| 8,082,593 | B2 * | 12/2011 | Sarioglu et al. | 850/6 |
| 2006/0150719 | A1 * | 7/2006 | Reinstadtler et al. | 73/105 |
| 2007/0113630 | A1 * | 5/2007 | Matsumoto et al. | 73/105 |
| 2008/0041143 | A1 * | 2/2008 | Sahin et al. | 73/105 |
| 2009/0145209 | A1 * | 6/2009 | Matsumoto et al. | 73/105 |
| 2010/0175155 | A1 * | 7/2010 | Sahin | 850/6 |
| 2011/0041224 | A1 * | 2/2011 | Raman et al. | 850/40 |
| 2013/0143331 | A1 * | 6/2013 | Ginger et al. | 436/174 |

OTHER PUBLICATIONS

Schade, W., et al., "Spatially Resolved Femtosecond Time Correlation Measurements on a GaAsP Photodiode," Optics Communications 162(4):200-204, Apr. 1999.

Trautman, J.K., and J.J. Macklin, "Time-Resolved Spectroscopy of Single Molecules Using Near-Field and Far-Field Optics," Chemical Physics 205(1-5):221-229, Apr. 1996.

(Continued)

*Primary Examiner* — Bernard E Souw
(74) *Attorney, Agent, or Firm* — Christensen O'Connor Johnson Kindness PLLC

(57) ABSTRACT

Methods and apparatus are provided herein for time-resolved analysis of the effect of a perturbation (e.g., a light or voltage pulse) on a sample. By operating in the time domain, the provided method enables sub-microsecond time-resolved measurement of transient, or time-varying, forces acting on a cantilever.

18 Claims, 27 Drawing Sheets

(56) References Cited

OTHER PUBLICATIONS

Albrecht, T.R., et al., "Frequency Modulation Detection Using HighQ Cantilevers for Enhanced Force Microscope Sensitivity," Journal of Applied Physics 69(2):668-673, Jan. 1991.
Ando, T., et al., "High-Speed Atomic Force Microscopy for Nano-Visualization of Dynamic Biomolecular Processes," Progress in Surface Science 83(7-9):337-437, Nov. 2008.
Balke, N., et al., "Real Space Mapping of Li-Ion Transport in Amorphous Si Anodes With Nanometer Resolution," Nano Letters 10(9):3420-3425, Sep. 2010.
Belaidi, S., et al., "Electrostatic Forces Acting on the Tip in Atomic Force Microscopy: Modelization and Comparison With Analytic Expressions," Journal of Applied Physics 81(3):1023-1030, Feb. 1997.
Boashash, B., "Estimating and Interpreting the Instantaneous Frequency of a Signal—Part 1: Fundamentals," Proceedings of the IEEE 80(4):520-538, Apr. 1992.
Clarke, T., and J.R. Durrant, "Charge Photogeneration in Organic Solar Cells," Chemical Reviews 110(11):6736-6767, Nov. 2010.
Coffey, D.C., and D.S. Ginger, "Time-Resolved Electrostatic Force Microscopy of Polymer Solar Cells," Nature Materials 5(9):735-740, Sep. 2006.
Coffey, D.C., et al., "Mapping Local Photocurrents in Polymer/Fullerene Solar Cells With Photoconductive Atomic Force Microscopy," Nano Letters 7(3):738-744, Mar. 2007.
Colchero, J., et al., "Resolution Enhancement and Improved Data Interpretation in Electrostatic Force Microscopy," Physical Review B 64(24):245403-1-245403-11, Dec. 2001.
Giridharagopal, R., and D.S. Ginger, "Characterizing Morphology in Bulk Heterojunction Organic Photovoltaic Systems," Journal of Physical Chemistry Letters 1(7):1160-1169, Apr. 2010.
Giridharagopal, R., et al., "New SPM Techniques for Analyzing OPV Materials," Materials Today 13(9):50-56, Sep. 2010.
Hamadani, B.H., et al., "Imaging of Nanoscale Charge Transport in Bulk Heterojunction Solar Cells," Journal of Applied Physics 109(12):124501-1-124501-7, Jun. 2011.
Ho, F., et al., "Ultrafast Voltage-Contrast Scanning Probe Microscopy," Nanotechnology 7(4):385-389, Dec. 1996.
Hosokawa, Y., et al., "Noncontact Estimation of Intercellular Breaking Force Using a Femtosecond Laser Impulse Quantified by Atomic Force Microscopy," Proceedings of the National Academy of Sciences USA (PNAS) 108(5):1777-1782, Feb. 2011.
Jaquith, M., et al., "Time-Resolved Electric Force Microscopy of Charge Trapping in Polycrystalline Pentacene," Journal of Physical Chemistry B Letters 111(27):7711-7714, Jul. 2007.
Jensen, S.E., et al., "Adaptive Control of Force Microscope Cantilever Dynamics," Journal of Applied Physics 102(5):054503-1-054503-7, Sep. 2007.
Kalinin, S.V., and D.A. Bonnell, "Imaging Mechanism of Piezoresponse Force Microscopy of Ferroelectric Surfaces," Physical Review B 65(12):125408-1-125408-11, Mar. 2002.
Kemiktarak, U., et al., "Radio-Frequency Scanning Tunnelling Microscopy," Nature Letters 450(7166):85-89, Nov. 2007.
Loth, S., et al., "Measurement of Fast Electron Spin Relaxation Times With Atomic Resolution," Science 329(5999):1628-1630, Sep. 2010.
Maturová, K., et al., "Scanning Kelvin Probe Microscopy on Bulk Heterojunction Polymer Blends," Advanced Functional Materials 19(9):1379-1386, May 2009.
Moore, A.M., et al., "Real-Time Measurements of Conductance Switching and Motion of Single Oligo(phenylene ethynylene) Molecules," Journal of the American Chemical Society 129(34):10352-10353, Aug. 2007.
Moore, E.W., et al., "Scanned-Probe Detection of Electron Spin Resonance From a Nitroxide Spin Probe," Proceedings of the National Academy of Sciences USA (PNAS) 106(52):22251-22256, Dec. 2009.
Nechay, B.A., et al., "Femtosecond Pump-Probe Near-Field Optical Microscopy," Review of Scientific Instruments 70(6):2758-2764, Jun. 1999.
Pingree, L.S.C., et al., "Imaging the Evolution of Nanoscale Photocurrent Collection and Transport Networks During Annealing of Polythiophene/Fullerene Solar Cells," Nano Letters 9(8):2946-2952, Aug. 2009.
Reid, O.G., et al., "Imaging Local Trap Formation in Conjugated Polymer Solar Cells: A Comparison of Time-Resolved Electrostatic Force Microscopy and Scanning Kelvin Probe Imaging," Journal of Physical Chemistry C 114(48):20672-20677, Dec. 2010.
Reid, O.G., et al., "Nanostructure Determines the Intensity-Dependence of Open-Circuit Voltage in Plastic Solar Cells," Journal of Applied Physics 108(8):084320-1-084320-8, Oct. 2010.
Rousso, I., et al., "Microsecond Atomic Force Sensing of Protein Conformational Dynamics: Implications for the Primary Light-Induced Events in Bacteriorhodopsin," Proceedings of the National Academy of Sciences USA (PNAS) 94(15):7937-7941, Jul. 1997.
Rugar, D., et al., "Single Spin Detection by Magnetic Resonance Force Microscopy," Nature 430(6994):329-332, Jul. 2004.
Sahin, O., et al., "An Atomic Force Microscope Tip Designed to Measure Time-Varying Nanomechanical Forces," Nature Nanotechnology 2(8):507-514, Aug. 2007.
Schade, W., et al., "Spatially Resolved Femtosecond Time Correlation Measurements on a GaAsP Photodiode," Optics Communications 162(4-6):200-204, Apr. 1999.
Shuttle, C.G., et al., "Experimental Determination of the Rate Law for Charge Carrier Decay in a Polythiophene: Fullerene Solar Cell," Applied Physics Letters 92(9):093311-1-093311-3, Mar. 2008.
Stark, M., et al., "Inverting Dynamic Force Microscopy: From Signals to Time-Resolved Interaction Forces," Proceedings of the National Academy of Sciences USA (PNAS) 99(13):8473-8478, Jun. 2002.
Terada, Y., et al., "Real-Space Imaging of Transient Carrier Dynamics by Nanoscale Pump—Probe Microscopy," Nature Photonics 4(12):869-874, Dec. 2010.
Weiss, S., et al., "Ultrafast Scanning Probe Microscopy," Applied Physics Letters 63(18):2567-2569, Nov. 1993.
Yang, X., et al., "Nanoscale Morphology of High-Performance Polymer Solar Cells," Nano Letters 5(4):579-583, Apr. 2005.
Yazdanian, S.M., et al., "Dielectric Fluctuations in Force Microscopy: Noncontact Friction and Frequency Jitter," Journal of Chemical Physics 128(22):224706-1-224706-13, Jun. 2008.
Yazdanian, S.M., et al., "Quantifying Electric Field Gradient Fluctuations Over Polymers Using Ultrasensitive Cantilevers," Nano Letters 9(6):2273-2279, Jun. 2009.

\* cited by examiner

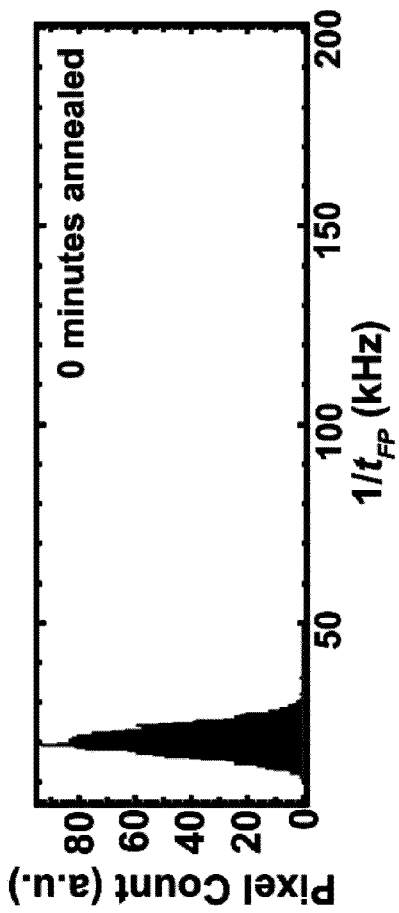
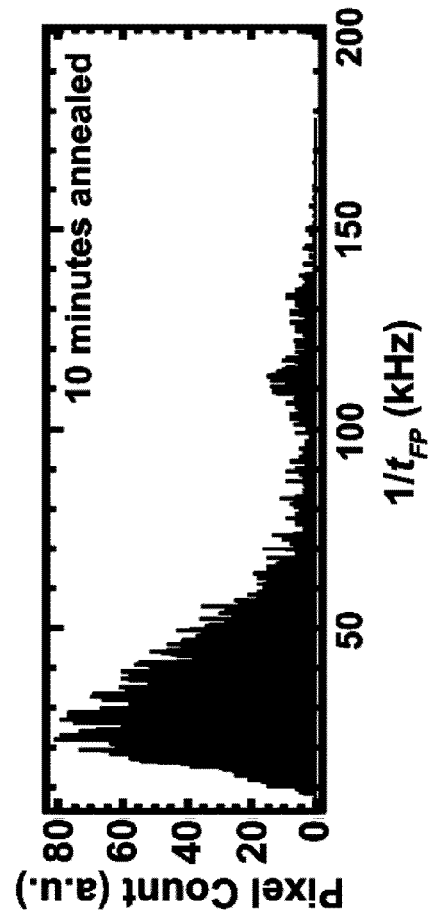
Fig.3G.
Fig.3H.

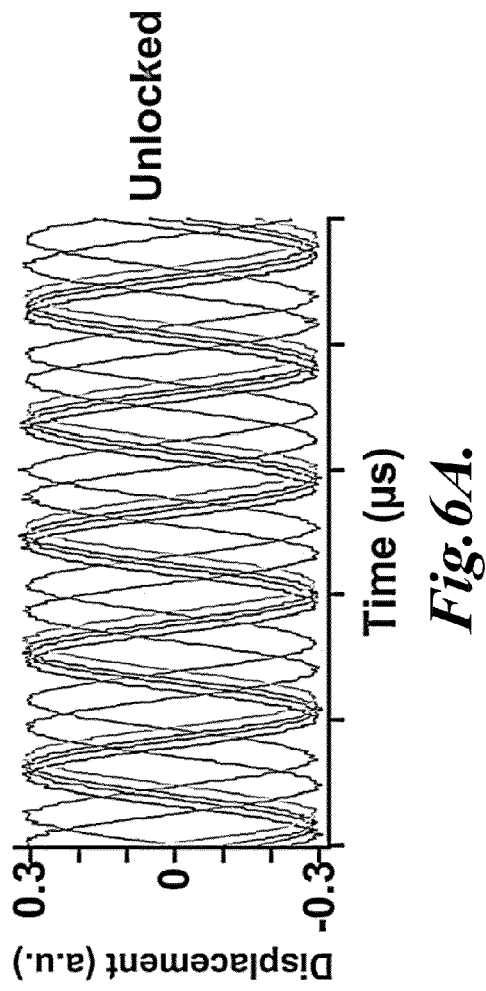
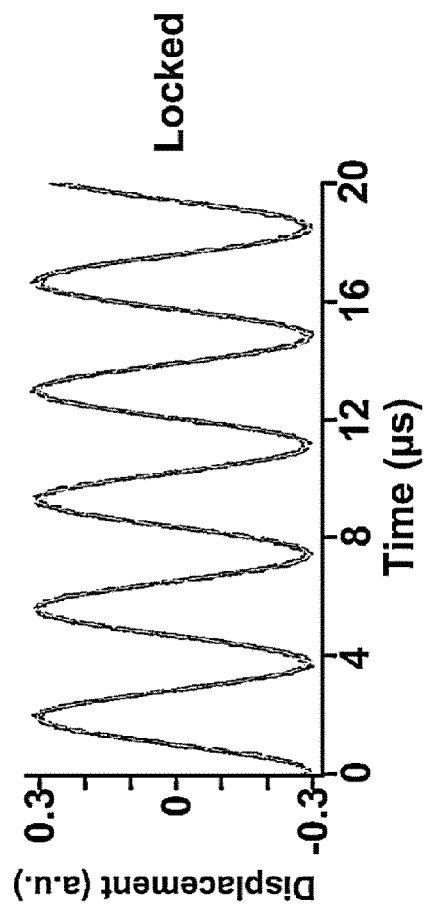
Fig. 6A.
Fig. 6B.

SUB-MICROSECOND-RESOLUTION PROBE MICROSCOPY

CROSS-REFERENCE TO RELATED APPLICATION

This application claims the benefit of U.S. Provisional Application No. 61/382,804, filed Sep. 14, 2010, which is expressly incorporated herein by reference in its entirety.

STATEMENT OF GOVERNMENT LICENSE RIGHTS

This invention was made with Government support under contract DE-SC0001084 awarded by the Department of Energy and under contract DMR 0449422 awarded by the National Science Foundation. The Government has certain rights in the invention.

BACKGROUND

Atomic force microscopy (AFM) is widely used in fields ranging from biophysics to surface chemistry. Through the use of mechanical and electrical feedback modes, AFM methods are used to study diverse problems such as mechanical properties and glass transitions in polymer blends, surface polarization in ferroelectrics, photogeneration of charge in solar cells, and energy storage in batteries. However, one area where AFM methods have not generally found widespread success is in the study of fast local dynamics. The fastest AFM methods typically acquire image scan lines at rates of ~3 kHz, while studies reporting time-resolved AFM measurements with commercial instruments often measure local processes on time scales of milliseconds.

Attempts to achieve ultrafast temporal resolution with scanning probe instruments have largely employed sophisticated combinations of pulsed laser optics with either near-field scanning optical microscopy or scanning tunneling microscopy (STM). More recently, time-resolved STM methods limited to the current preamplifier bandwidth or using radio-frequency STM have been reported. These techniques can provide powerful probes in systems with suitable optical or electronic properties, but generally require complex, expensive specialty hardware and are restricted in their ability to study materials with low optical contrast or high conductivity. As a result, these probes have been limited primarily to niche applications.

What is desired, therefore, is an improved microscopy method capable of nanosecond-scale temporal resolution.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a time-resolved microscopy method is provided for measuring the response of a sample to a perturbation. The method uses a cantilever positioned adjacent a first location of the sample. In one embodiment, the method comprises the steps of:
  (a) applying the perturbation to the sample at a first time;
  (b) measuring the motion of the cantilever in response to the effect of the perturbation on the sample for a predetermined first length of time, to provide a deflection signal, in the absence of a feedback loop configured to regulate cantilever motion following the perturbation; and
  (c) determining from the deflection signal the time-domain properties of the effect of the perturbation on the first location of the sample.

In another aspect, an apparatus is provided. In one embodiment, the apparatus includes:
  a cantilever configured to measure the response of a sample adjacent the cantilever;
  a drive controller configured to oscillate the cantilever at a drive frequency;
  a detector in communication with the cantilever, which is configured to measure the response of the cantilever;
  an excitation signal generator configured to apply a perturbation to the sample; and
  a triggering circuit configured to coordinate the response of the cantilever and the perturbation such that the perturbation occurs at the about the same position in the cantilever oscillation cycle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3G and 3H illustrate histograms of FF-trEFM $1/t_{FP}$ values for an unannealed (FIG. 3G) and 1 minute annealed film (FIG. 3H), showing that the average and standard deviation both increase with annealing time, consistent with reported short-circuit photocurrent image data.

FIGS. 5C and 5D: through consecutive voltage pulses, it is possible to determine the lower limit of approximately 100 μs for the old trEFM method, wherein FIG. 5C illustrates the distinction of consecutive voltage pulses using the embodiments provided herein and FIG. 5D illustrates the same frequency of voltage pulse using a traditional time-resolved electrostatic force microscopy system, which cannot distinguish consecutive pulses as quickly as those of the embodiments provided herein (i.e., FIG. 5C).

FIGS. 6A and 6B: Consecutive digitized deflection waves showing significant jitter without (FIG. 6A) and with (FIG. 6B) a triggering circuit. The circuit ensures that the voltage and light are applied at the same point in the cycle, thus improving averaging by eliminating the averaging errors that can occur in the unlocked trigger case.

(FIG. 11A) Changing the force plays a significant role in the $t_{FP}$ values in the sub-10 μs regime. (FIG. 11B) Changing the frequency shift affects the proportionality between $t_{FP}$ values at a given sub-10 μs level; as the frequency shift increases, the larger the difference in $t_{FP}$ between two consecutive voltage rise times. Bolded values (0.2 nN in FIG. 11A and 75 Hz in FIG. 11B) indicate typical experimental conditions on a PFB:F8BT blend. Insets show the sub-5 μs data on a linear scale.

DETAILED DESCRIPTION

Figure 1A:
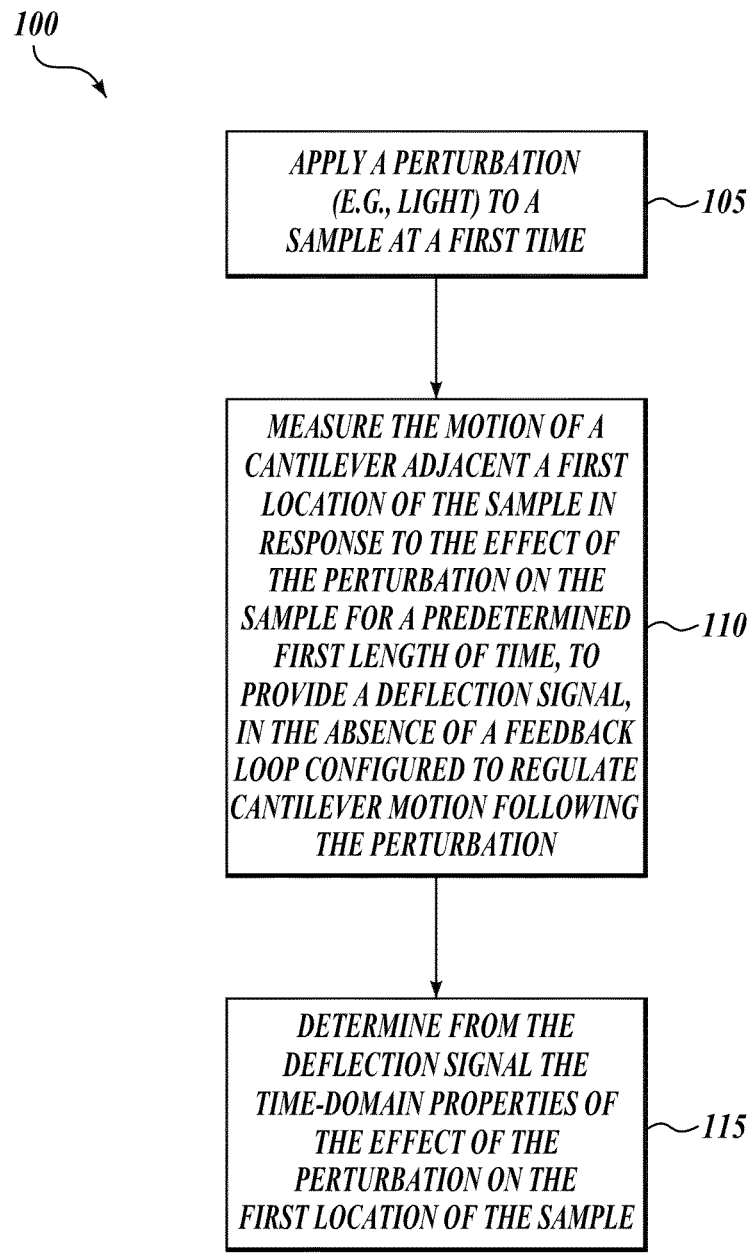
FIG. 1A diagrammatically illustrates the steps of a representative method in accordance with the embodiments provided herein.

Methods and apparatus are provided herein for time-resolved analysis of the effect of a perturbation (e.g., a light pulse) on a sample. By reconstructing time domain information (in particular, the rise or decay time of a pulse, hereafter τ), the provided method enables sub-microsecond time-resolved measurement of transient, or time-varying, forces acting on a cantilever.

By extracting time-domain information, the embodiments described herein greatly exceed the resolution and experimental capabilities of current mechanical systems (such as atomic force microscope (AFM)-based systems). The transient, or time-varying, forces applied to the systems under study include forces such as light, magnetic fields, fast biological forces and motions, radio frequency (RF) pulses, and electrical forces. Accordingly, the systems and methods described herein provide a powerful new tool to observe the effects of various forces on a sample with a time resolution in the sub-microsecond scale, which enables the observation of the effects of the force as it impacts and dissipates in reaction to the sample. Such a tool is useful, for example, to study the fundamental charge carrier transport and photo-generation phenomena in photovoltaic materials, as is described in more detail in the Example section below.

While the embodiments herein are primarily described with reference to AFM-related methods, it will be appreciated that any scanning probe microscopy (SPM) method compatible with the provided embodiments may be enhanced accordingly.

In one aspect, a time-resolved microscopy method is provided for measuring the response of a sample to a perturbation. The method uses a cantilever positioned adjacent a first location of the sample. In one embodiment, the method comprises the steps of:

(a) applying the perturbation to the sample at a first time;
(b) measuring the motion of the cantilever in response to the effect of the perturbation on the sample for a predetermined first length of time, to provide a deflection signal, in the absence of a feedback loop configured to regulate cantilever motion following the perturbation; and
(c) determining from the deflection signal the time-domain properties of the effect of the perturbation on the first location of the sample.

The method will be described further with reference to FIG. 1, which is a flowchart illustrating the method 100 in three steps.

In the first step 105 of the method, a perturbation, such as light, a magnetic field, an RF pulse, etc., is applied to a sample at a first time. The sample can be any sample known to those of skill in the art, as described above. The first time is the time at which the perturbation affects the sample, and the first time is noted for later processing to determine the time-domain properties of the effect of the perturbation on the sample.

The sample studied can be any sample about which the transient, or time-varying, properties of the sample are to be characterized. Representative samples include materials that respond to light (e.g., photovoltaic materials), magnetism, electrical signals, and/or radio frequency (RF) pulses.

The method continues with a step 110 where the motion of a cantilever adjacent to a first location of the sample is measured. The first location can be any location on the sample and is a location of interest to a user performing the method. The effect of the perturbation on the sample at the first location is measured for a predetermined first length of time. The measured motion of the cantilever over the first length of time is a deflection signal that indicates the response of the cantilever to the perturbation. The combination of steps 105 and 110 are referred to herein as a "perturbation/measurement cycle".

The cantilever that is positioned adjacent the first location of the sample can be any cantilever known to those of skill in the art. Of particular use are cantilevers used with scanning probe microscopy (SPM) techniques, such as atomic force microscopy (AFM).

Notably, in step 110, no feedback loop is used to regulate cantilever motion following the perturbation. In traditional SPM (e.g., AFM) methods, a feedback loop is used to maintain a characteristic of the cantilever motion during scanning. For example, if an oscillating cantilever is used in an AFM technique, the phase, amplitude, or frequency of the oscillation can be maintained at a fixed value and the positioning or the force applied to the cantilever is altered during scanning so as to maintain the constant characteristic. E.g., if a constant phase feedback loop is used, as an AFM cantilever is scanned across a sample surface, a change in phase detected by the cantilever is processed in a feedback loop and the positioning, or the oscillating force applied by the cantilever driver, is altered so as to maintain a constant phase.

In the present embodiments, the cantilever is positioned above a single location on a sample at a fixed height and the response of the cantilever to the sample at the first location after the perturbation is applied is determined without adjusting the characteristics of the cantilever using a feedback loop following the perturbation. That is, the cantilever is not adjusted in position, frequency of oscillation, etc. as an adjustment related to the response of the cantilever to the perturbation. This feedback-free regime allows the cantilever to oscillate freely, and those oscillations, in response to the response of the sample to the perturbation, yield the data required to extract time-domain properties from the deflection signal of the cantilever.

Accordingly, the method concludes with a step 115 of determining from the deflection signal of the cantilever the time-domain properties of the effect of the perturbation on the first location of the sample.

The techniques used to determine, from the deflection signal, the time-domain properties of the effect of the perturbation on the sample are generally known to those of skill in the art, although these techniques have not before been applied to applications such as those described in the embodiments described herein. Essentially, the goal of the method 100 is to quantitate the effect of the perturbation on the cantilever as the effect of the perturbation changes over time. In order to accomplish this, several different methods can be used to analyze the transient motion of the cantilever as a function of time, including a Hilbert Transform, as described in the Example below, a moving window fast Fourier transform, fitting of sine curves to portions of the signal, and other data analysis and signal processing methods known to those of skill in the art. These transformations all require certain input from the measurement system. The input required includes the conditions of the sample and the cantilever prior to the application of the perturbation and then the conditions of the cantilever as they change over time in response to the perturbation. The deflection signal of an AFM is an exemplary means for determining the effect of the perturbation on the sample over time, as the measurement of the deflection signal over time indicates the response of the cantilever to the sample, which is in turn responding to the perturbation. By collecting continuous or closely spaced data over a fixed time window, the response of the cantilever to the sample, which is in turn reacting to the perturbation, can be determined.

Figure 1B:
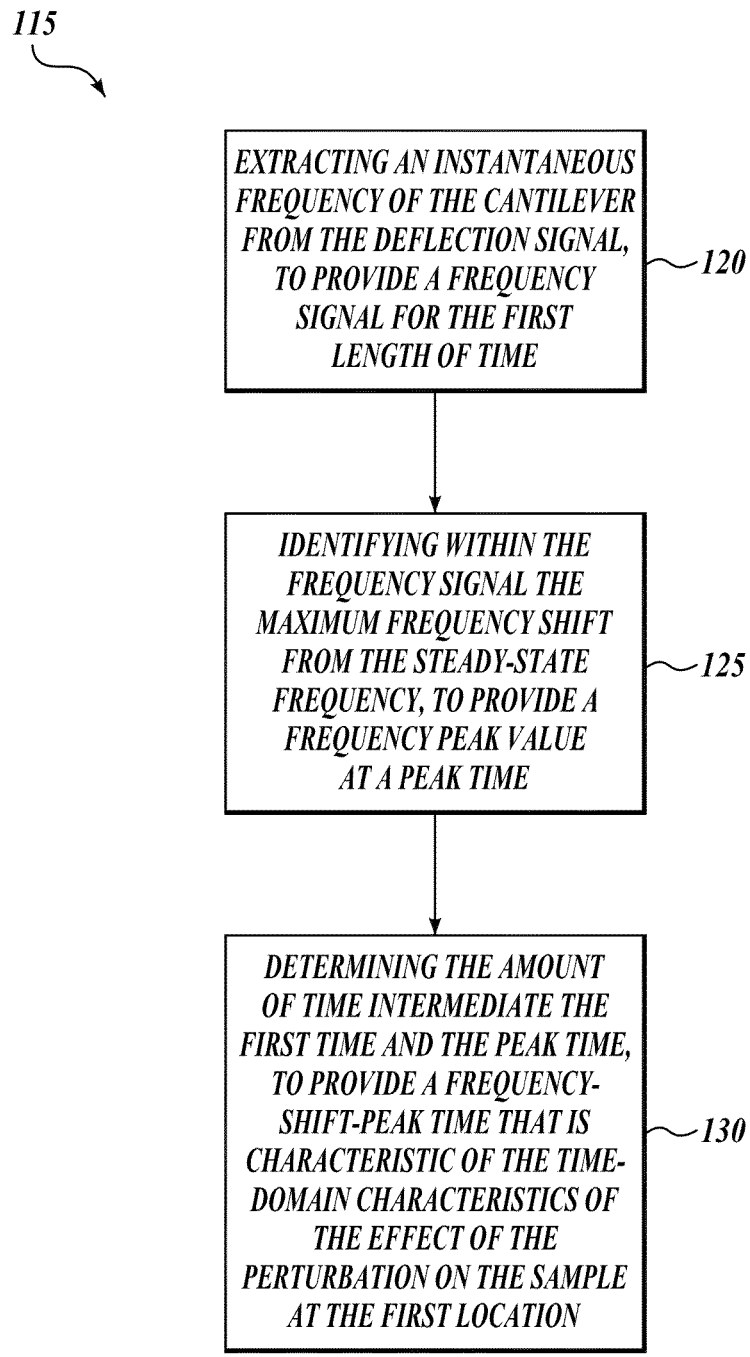
FIG. 1B diagrammatically illustrates an embodiment of a variation of the method illustrated in FIG. 1A, wherein frequency is used to determine the time-domain properties of the effect of a perturbation on a sample.

In certain embodiments, the cantilever is an oscillating cantilever. Oscillating cantilevers are known to those of skill in the art, and they are sometimes known, in the context of AFM, as tapping-mode cantilevers, AC cantilevers, intermittent contact-mode cantilevers, and the like. In one embodiment of the method, as illustrated in FIG. 1B, an oscillating cantilever is used to determine the time-domain properties of the effect of the perturbation on the first location of the sample, as set forth in step 115 of the method 100 illustrated in FIG. 1A. Referring to FIG. 1B, the oscillating cantilever embodiment of step 115 is illustrated in FIG. 1B and begins with a sub-step 120 of extracting an instantaneous frequency of the cantilever from the deflection signal to provide a frequency signal for the first length of time. This step requires, for example, determining an instantaneous phase of the cantilever from the deflection signal, and from the instantaneous phase, the frequency signal is determined. Such a transformation can be accomplished using the Hilbert Transform, moving window fast Fourier Transform, fitting of sine curves to portions of the signal, and other techniques known to those of skill in the art.

After the frequency signal for the first length of time is determined, the method 100 proceeds to a sub-step 125 of identifying within the frequency signal the maximum frequency shift from the steady-state frequency (i.e., the frequency of the cantilever oscillation prior to the application of the perturbation), to provide a frequency peak value at a peak time.

Finally, the method 100 concludes with a sub-step 130 of determining the amount of time intermediate the first time and the peak time. This determination provides a frequency-shift-peak time ($t_{FP}$) that is characteristic of the time-domain characteristics of the effect of the perturbation on the sample at the first location. The $t_{FP}$ is a figure of merit for the provided method that is used herein. However, it will be appreciated that other time-domain figures of merit may be used to characterize a sample. Therefore, the methods provided herein are not limited to methods for determining the $t_{FP}$ of a sample location. Both sub-steps 120 and 125 are described in greater detail in the Example below. Specifically, the method steps illustrated in FIG. 1B are set forth in greater detail, and in exemplary embodiments, with reference to FIG. 1D (and subsequent figures) in the Example section below.

In certain embodiments, the methods described above (i.e., FIGS. 1A and/or 1B) further comprise a step of repeating the steps of applying the perturbation and measuring the motion of the cantilever in response to the effect of the perturbation multiple times at the first location using the same magnitude of perturbation. This embodiment includes averaging the multiple deflection signals to provide an averaged deflection signal. The averaged deflection signal is then used as the primary deflection signal when determining the time-domain properties of the effect of the perturbation on the first location of the sample. This embodiment may be better understood with reference to FIG. 1A and the method 100 described therein. In the method 100, the steps 105 and 110 relate to applying a perturbation to a sample and then measuring the motion of the cantilever adjacent the sample in response to the perturbation. In the presently described embodiments, the steps of applying a perturbation and then measuring the motion of the cantilever in response to the perturbation (steps 105 and 110) are repeated two or more times and the results of those repetition cycles are then averaged to provide an averaged deflection signal for use in step 115. By averaging the perturbation/measurement cycles at a given point, the signal-to-noise ratio is greatly improved, removing thermal, acoustic, and environmental noise that would ordinarily set limit the accurate determination of the cantilever motion following a transient perturbation. Thus, while averaging increases the total measurement time, it does so while at the same time increasing the ability to characterize the time-domain properties of very fast behaviors in the sample. As set forth below in the examples, discrimination of differences of ~100 nanosecond between different transient perturbations can be achieved using the methods and apparatus disclosed herein.

In certain embodiments, when multiple perturbation/measurement cycles are performed, as set forth in certain embodiments above, the method further comprises the step of applying the perturbation and measuring the motion of the cantilever in response to the effect of the perturbation multiple times by synching (i.e., coordinating) the position of the cantilever and the perturbation, such that the perturbation occurs at about the same position in the cantilever oscillation cycle each time that the perturbation is applied. As used herein, when the perturbation is coordinated so as to occur at about the same position in the cantilever oscillation cycle, the term "about" means that the coordination results in the perturbation being applied with an accuracy that is better than the ultimately desired time resolution. In other words, to achieve sub-microsecond time resolution, two coordinated perturbation/measurement cycles must occur at the same point in subsequent oscillation cycles with an error less than a fraction of a microsecond.

In certain embodiments, the perturbation always occurs at the same position in the cantilever oscillation cycle.

Such coordination is typically accomplished using a triggering circuit, as set forth in the apparatus embodiments described below, although it will be appreciated that any apparatus or method for coordinating the position of the cantilever oscillation and the application of the perturbation is useful in the embodiments provided herein. The trigger circuit allows the data to be averaged to achieve sub-cycle time resolution. While an ideal trigger circuit would fire at the exact same position in the cantilever cycle, a practical trigger may have some phase jitter. However, increasing amounts of phase jitter from the trigger will necessarily reduce the achievable time resolution.

When a cantilever oscillates, the oscillation is essentially in the z direction, as defined as the direction extending perpendicularly from the sample surface probed by the cantilever. Essentially, the cantilever is vibrating up and down at a very fast rate (e.g., a 300 kilohertz rate). For consistency, when averaging similar perturbation/measurement cycles, the triggering circuit (or other coordination circuit) takes into account the vertical position above the sample at which the cantilever is positioned (e.g., is at an oscillation peak or trough) and the perturbation is applied at the same point in the oscillation cycle during each of the perturbation/measurement cycles used to average together a single deflection signal. For example, the triggering circuit may be configured to wait to deliver a perturbation (e.g., a light flash) until the cantilever is oscillating at a peak (as defined as the furthest in the z direction that the cantilever is above the sample). By only applying the perturbation when the cantilever is at a specific point in its oscillation cycle, the data can be averaged to obtain sub-cycle information about the effect of the perturbation on the sample. Furthermore, the position within the cantilever oscillation cycle at which the perturbation is applied can be chosen to minimize (or maximize) the relative contribution the sensitivity of the method to transient forces relative to transient force gradients.

In certain embodiments, the method further comprises rastering the cantilever across the sample to multiple locations while determining, from the deflection signal at each of the multiple locations, the time-domain properties of the effect of the perturbation on the multiple locations of the sample to provide an image of the sample. In this embodiment, the method is used in a similar fashion as is used in typical SPM methods where a cantilever is rastered across a surface, acquiring data at discrete points continuously across a surface so as to form a 2-(or 3-) dimensional image of the surface by combining each of the discrete points into a single data image (see, e.g., FIG. 3F, and its description in the Example section, as an example of a rastered image obtained using the provided method and apparatus).

In the embodiments described herein, rastering can be performed by acquiring only a single perturbation/measurement cycle per location, or the cantilever can dwell at a single location for several perturbation/measurement cycles so as to acquire an average deflection signal (i.e., to improve signal quality). While dwelling to acquire an average signal provides an improved signal quality, such averaging can also be time-consuming while the perturbation/measurement cycle proceeds several times, compared to a single perturbation/measurement cycle per location on the sample. Accordingly, the number of perturbation/measurement cycles per location on the sample can be varied according to the balancing of the time required to average a signal versus the quality of the signal desired by a user.

Figure 3A:
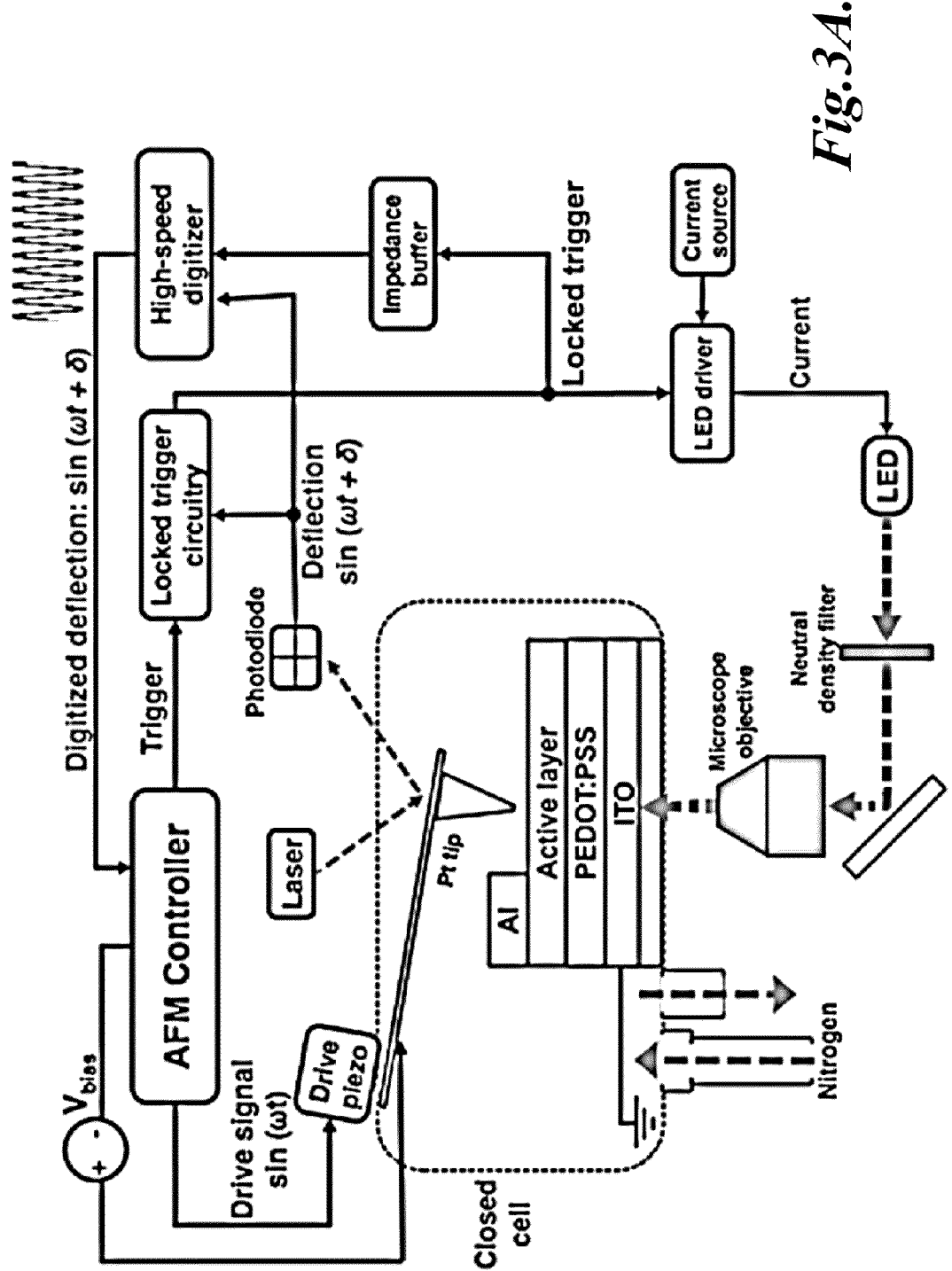
FIG. 3A is an instrumentation schematic for OPV characterization, showing the sample purged under constant nitrogen flow and transient perturbation caused by photoinduced charging via a pulsed LED (523 nm).
Figure 3B:
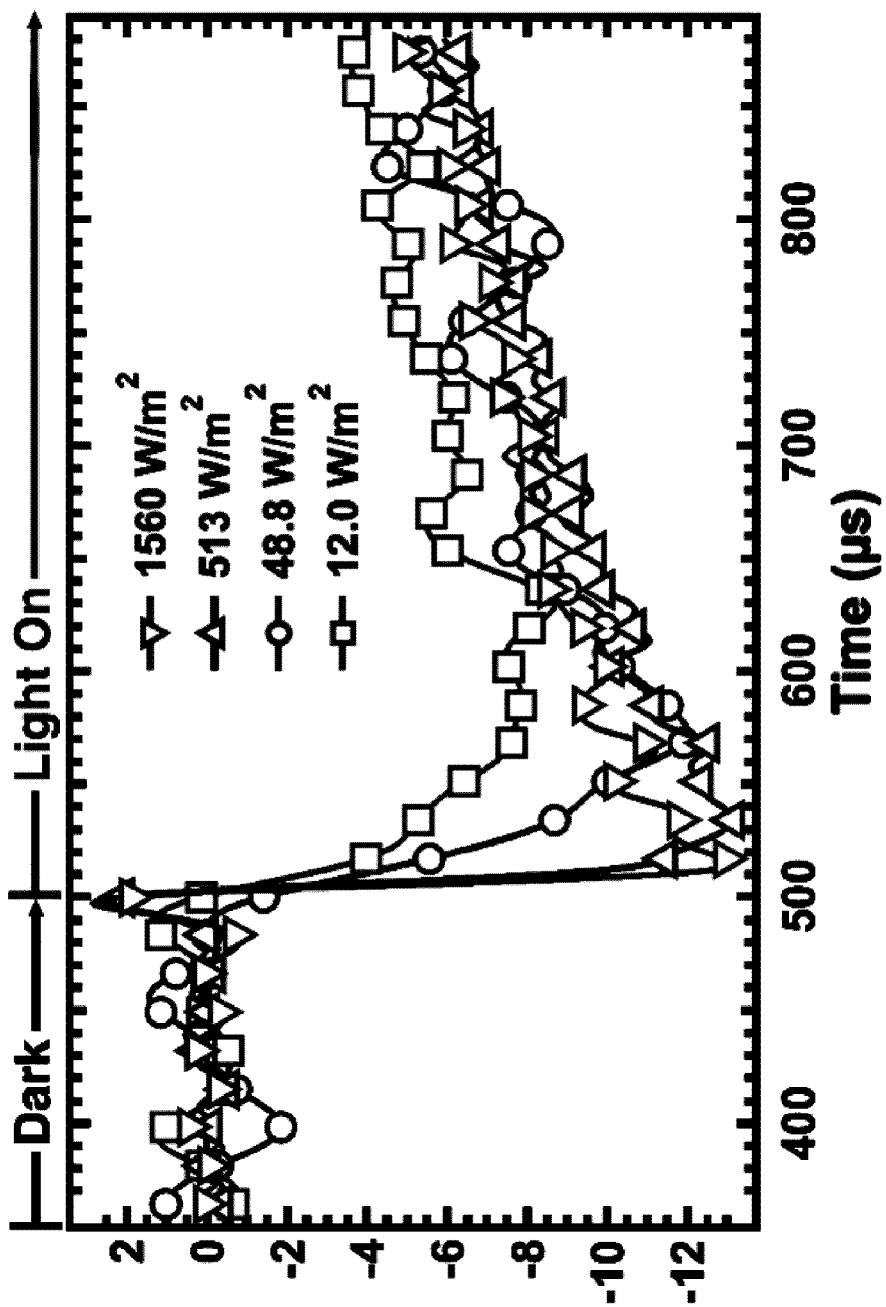
FIG. 3B illustrates instantaneous frequency data for a range of light intensities on a ~51% EQE P3HT:PCBM film showing that photoinduced charging represents a transient force and force gradient effect similar to a root-exponential voltage of characteristic τ as in FIG. 2.
Figure 3C:
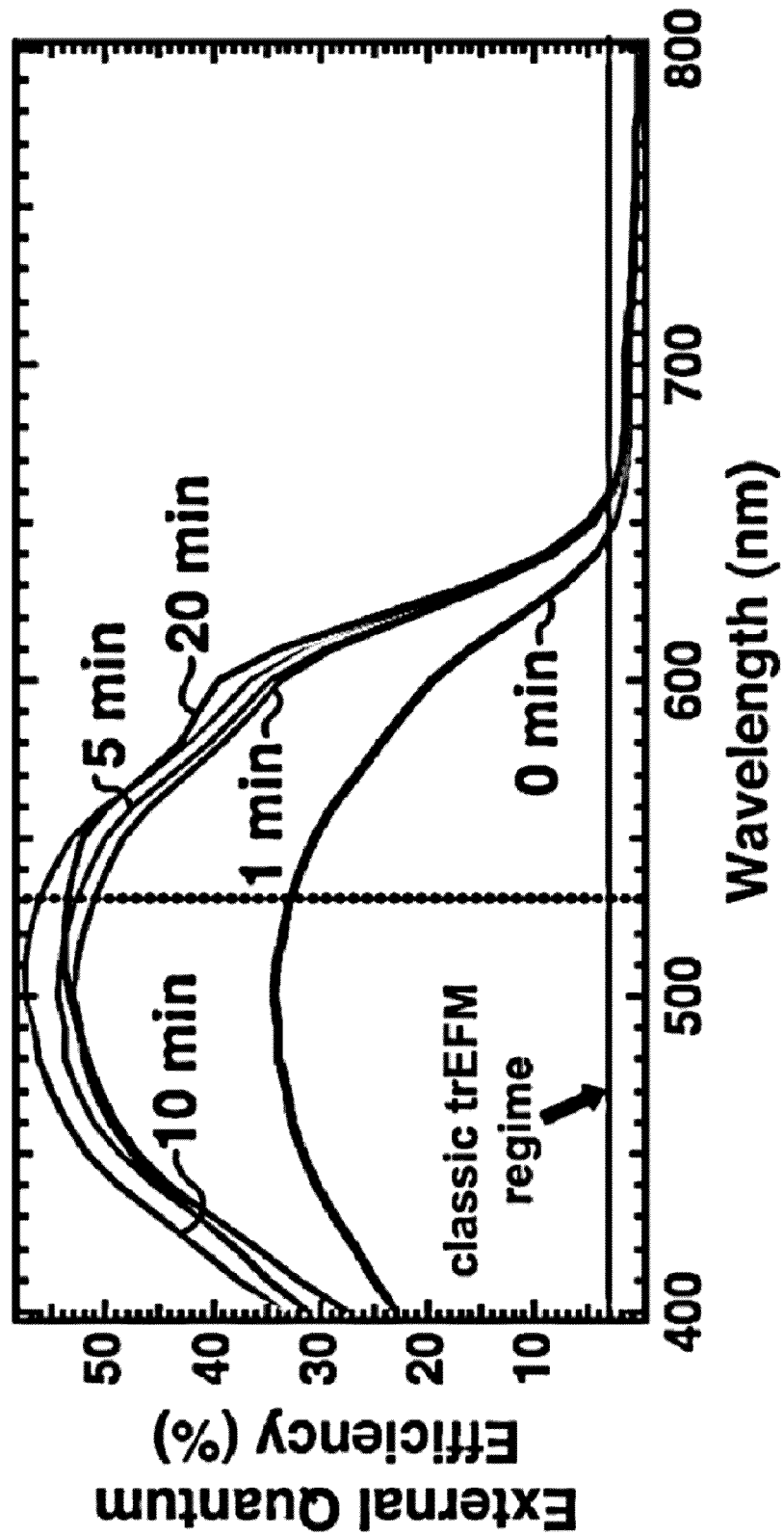
FIG. 3C illustrates external quantum efficiency (EQE) measurements on five P3HT:PCBM devices annealed at 110° C. for 0 (unannealed), 1, 5, 10 and 20 minutes. The green line is at the LED wavelength, ~523 nm. The shaded region indicates previously-accessible device efficiencies using traditional feedback-based methods.
Figure 3D:
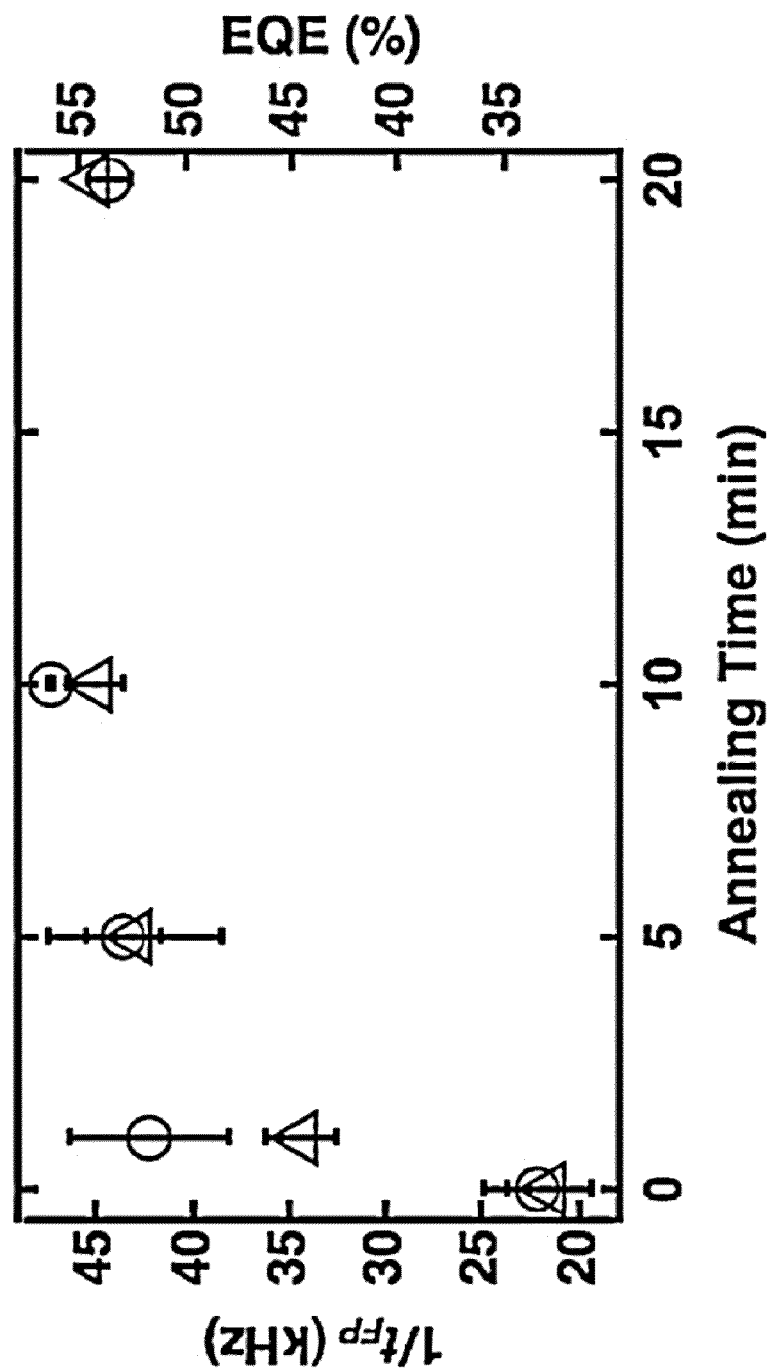
FIG. 3D illustrates spatially averaged $1/t_{FP}$ values (triangles) versus EQE (circles) for the four devices measured. The error bars represent standard deviation of the mean for several areas ($t_{FP}$) and several pixels (EQE).
Figure 3E:
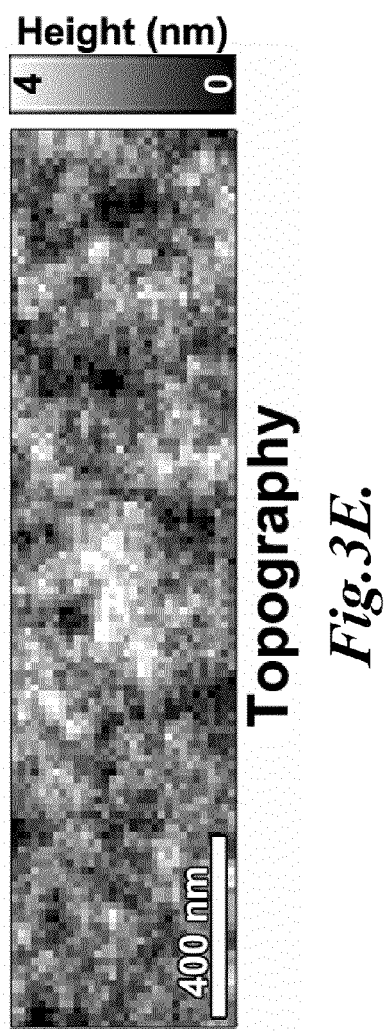
FIGS. 3E and 3F illustrate topography (FIG. 3E) and the FF-trEFM image (FIG. 3F) of a ~51% EQE nanostructured organic photovoltaic device (P3HT:PCBM film) showing spatial variation in the $1/t_{FP}$ values with values as low as sub-30 μs when exposed to LED intensity of 513 W/m².
Figure 3F:
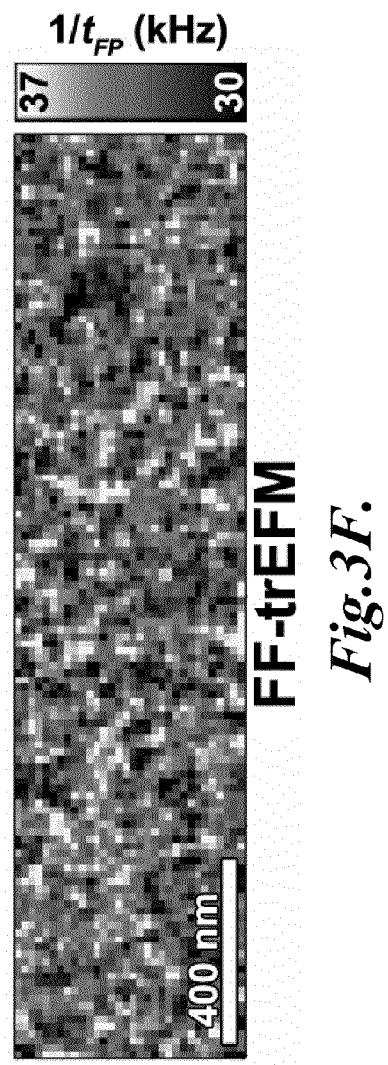

In FIG. 3F, six averages were taken per point at a sampling rate of 5 MHz to achieve an optimal balance. Additionally, in the limit when lateral drift in the instrument is minimized, multiple data sets over the same region can be acquired and the signals can be further averaged together to improve signal: noise. To construct an image, a standard two-pass method is employed. In the first pass, the cantilever records a line using standard height-imaging. This height data is then used on a second pass, known to those who practice EFM, to control the height of the cantilever. Additionally, in the second pass, the cantilever is subject to the perturbation applied at each point and the deflection data digitized and recorded in the computer controlling the instrument. This process is repeated for each line in the image; in FIG. 3F this is 64 lines with 128 data points per line. After data acquisition, the data for each line are processed point-by-point using the Hilbert transform method above to acquire the frequency shift peak time, thereby constructing an image.

The methods described above can be performed using any apparatus capable of performing each of the steps of the method as set out. In certain instances, these method steps may be performed on commercially available atomic force microscopes, with little or no modification. However, traditional AFMs do not include analysis software capable of the time-domain conversions required to perform the methods provided herein. Accordingly, the methods provided herein may be implemented in software stored on a computer-readable medium, as is known by those of skill in the art. The method may be performed on a computer attached to an atomic force microscope, such that the computer is configured to control the characteristics of the cantilever to coordinate the detection of the cantilever, to deliver the coordinated perturbation and to analyze the resulting deflection signal so as to transform the deflection data into time-domain data to determine the time-domain properties of the effect of the perturbation on the sample, in accordance with the embodiments provided herein.

In addition to the method embodiments set forth above, additional aspects provided herein include an apparatus configured to measure the time-domain properties of the effect of a perturbation on a sample. Such an apparatus is capable of, for example, performing the methods set forth above. However, it will be appreciated that the apparatus provided herein is not limited to an apparatus configured to perform the embodiments provided herein and may be used for additional uses.

In another aspect, an apparatus is provided. In one embodiment, the apparatus includes:
a cantilever configured to measure the response of a sample adjacent the cantilever;
a drive controller configured to oscillate the cantilever at a drive frequency;
a detector in communication with the cantilever, which is configured to measure the response of the cantilever;
an excitation signal generator configured to apply a perturbation to the sample; and
a triggering circuit configured to coordinate the response of the cantilever and the perturbation such that the perturbation occurs at the about the same position in the cantilever oscillation cycle.

Figure 1C:
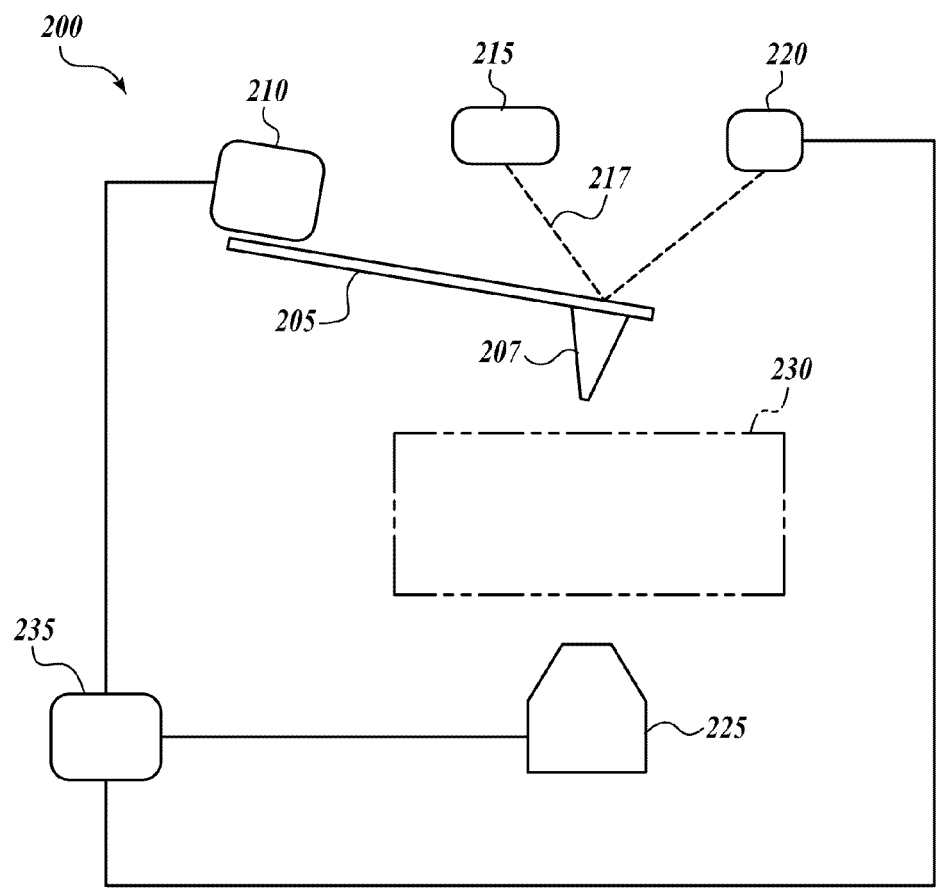
FIG. 1C diagrammatically illustrates a representative apparatus for characterizing a sample in accordance with the embodiments provided herein.

The apparatus may be better understood with reference to FIG. 1C, which illustrates an apparatus 200. The apparatus 200 includes a cantilever 205. The cantilever can be any cantilever known to those of skill in the art, such as an atomic force microscope cantilever. The cantilever 205 may include a tip 207 that is made of the same, or different, material as the body of the cantilever 205. Depending on the type of perturbation and the expected reaction of the sample 230 to the perturbation, the tip 207 or cantilever 205 material is selected. That is, if an electrical response from the sample 230 is expected, the cantilever 205 and tip 207 may be conductive and held at a potential in relation to the sample 230, so as to register the electronic changes in the sample using electrostatic forces (e.g., electrostatic force microscopy (EFM)). Similarly, if a magnetic response is expected from a sample, the cantilever 205 is configured to register changes in the magnetic field of the sample.

The cantilever 205 is controlled by a drive controller 210. When the cantilever 205 is oscillated, the drive controller 210 applies the oscillation drive signal at a particular frequency. The drive controller 210 may also control the positioning of the cantilever 205 in relation to the sample 230 (e.g., controls the height of the cantilever 205 above the sample).

The apparatus 200 also includes a detector 220 in communication with the cantilever 205 that is configured to measure the response of the cantilever 205 to the response of the sample in relation to the perturbation. In typical AFM systems, the detector 220 is an optical detector that detects an optical beam 217 (e.g., a laser) emitted from a light source 215 and reflected off the top of the cantilever 205 into the detector 220. Small fluctuations in the oscillation/position of the cantilever 205 can be detected.

The apparatus 200 also includes an excitation signal generator 225 configured to apply a perturbation to the sample. The excitation signal generator 225 can apply a perturbation of any type known to those of skill in the art to the sample. Representative perturbation types have been discussed herein and include applying light, magnetic fields, electrical fields, RF pulses, or combinations thereof.

Finally, the apparatus 200 includes a triggering circuit 235 that is configured to coordinate the response of the cantilever 205 (i.e., via the detector 220) and the perturbation (i.e., via the excitation signal generator 225) such that the perturbation occurs at about the same position in the cantilever oscillation cycle. The triggering circuit 235 is configured to allow for averaging the deflection signal from multiple perturbation/measurement cycles, as set forth above with regard to the methods provided herein. Such averaging allows for improved signal quality.

In certain embodiments, the apparatus may also include a system controller that is in communication with the drive controller 210. The system controller is configured to control the drive frequency applied by the drive controller. The system controller can also be in communication with the triggering circuit 235 and/or the detector 220. It will be appreciated that the triggering circuit and system controller may all be integrally located in a single piece of equipment, or may be separate components of the larger apparatus.

In certain embodiments, the excitation signal generator 225 and the cantilever 205 are both configured to be in communication with a first location of a sample 230. As illustrated in FIG. 1C, when the cantilever 205 includes a tip 207, the tip 207 and the excitation signal generator 225 are located on opposite sides of the first location of the sample 230. It will be appreciated that this arrangement need not be specifically used, as long as the first location of the sample 230 is in contact (e.g., optical, electrical, magnetic, etc., contact) with the first location, and the cantilever 205 is adjacent to the first location 230 such that the response of the first location to the perturbation can be detected by the cantilever 205.

In certain embodiments, the excitation signal generator 225 generates a perturbation that is transient or time-varying. As set forth above with regard to the methods provided herein, a transient or time-varying signal changes over time and therefore the time-domain properties of the effect of the perturbation on the sample can be used to characterize the material of the sample.

In certain embodiments, the apparatus 200 does not utilize a feedback loop to regulate the motion of the cantilever 205 following the perturbation. Particularly, as set forth above with regard to the method embodiments, the traditional use of a feedback loop to maintain constant phase frequency or amplitude of a cantilever oscillation is not employed in the presently described embodiments. By operating in a feedback-free regime, the present embodiments allow for the time-domain properties of the effect of the perturbation to be determined orders of magnitude more sensitively than those methods that utilize feedback loops to regulate cantilever motion.

In certain embodiments, the apparatus 200 also includes a positioning controller (not illustrated) that is configured to position the cantilever 205 in relation to the sample, for example, in the x, y, and z planes in relation to the sample surface. Such a positioning controller allows for the rastering of the cantilever 205 across the surface of the sample to multiple locations so as to form a two- or three-dimensional image of the sample surface.

The following example is intended to illustrate, and not limit, the embodiments disclosed herein.

Example

Feedback-Free Time-Resolved Electrostatic Force Microscopy (FF-trEFM)

To address the shortcomings of time-resolved microscopy methods fast frequency-shift feedback methods implemented in custom software on commercial AFM hardware were previously used to measure fast processes such as the accumulation of photogenerated charges in low-efficiency polymer solar cells on time scales approaching ~100 μs using time-resolved electrostatic force microscopy (trEFM). While fast compared to most atomic force microscopy (AFM) methods, even 100 μs is insufficient to study many processes of relevance in physical systems of interest (including more efficient organic and inorganic solar cells). In principle, one could achieve better time resolution by using more sophisticated feedback controls. However, any feedback system will ultimately face a signal/noise limit based on the slowest component in the loop. Here, we describe a feedback-free (FF-trEFM) approach to obtaining information about fast local force transients in an AFM and show that the method is capable of discerning useful information about fast local dynamics with transient rise times as short as ~200-300 ns.

Figure 1D:
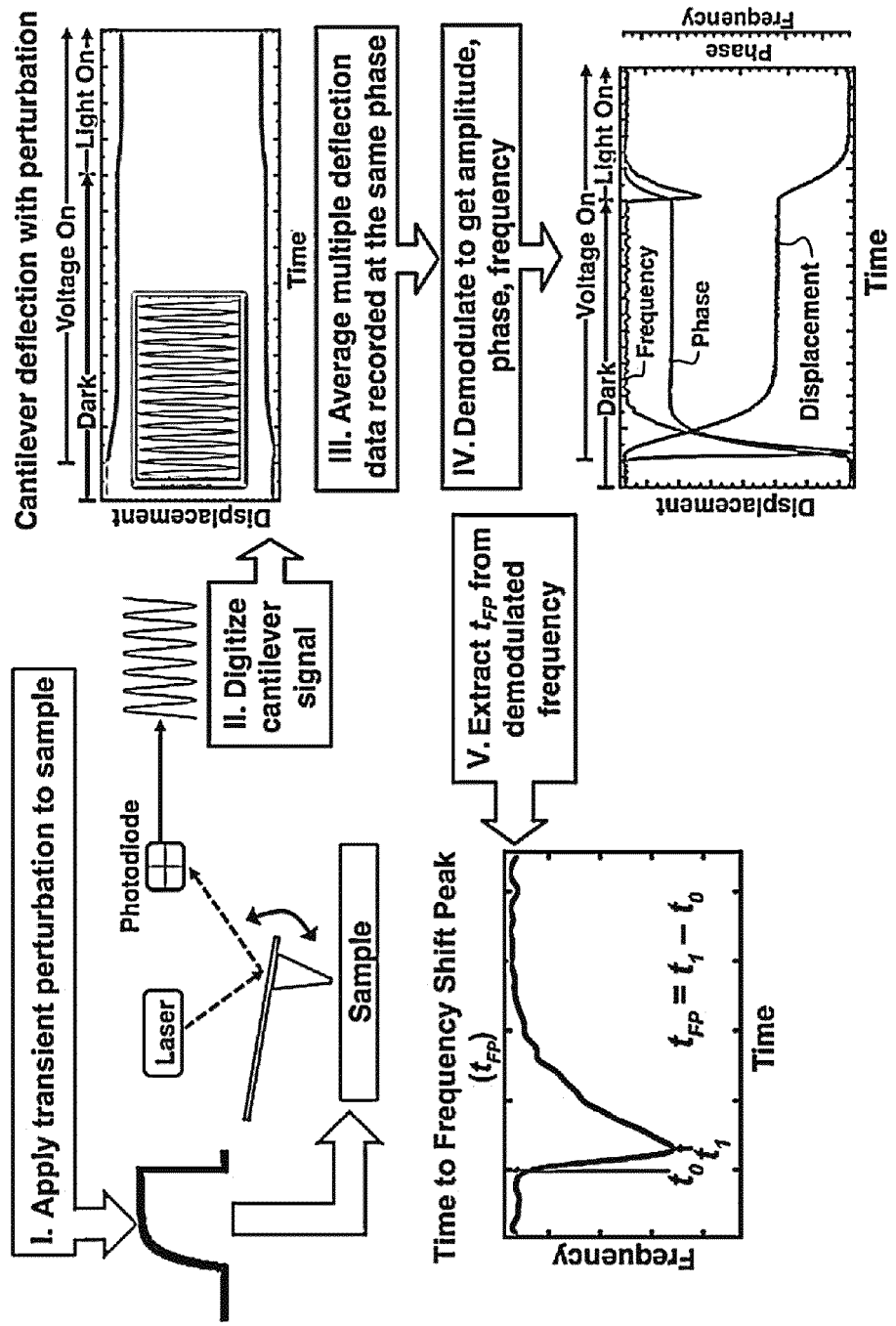
FIG. 1D is a block diagram illustrating feedback-free time-resolved electrostatic force microscopy (FF-trEFM) operation. After feedback is turned off, the cantilever signal is digitized and recorded with high sampling rate (typically 50 MHz). Multiple runs, with the excitation applied at the same phase, are averaged and demodulated to acquire the instantaneous frequency. The metric of interest is the time between excitation and maximum frequency shift from steady state (time to frequency shift peak, $t_{FP}$).

The method, summarized in FIG. 1D, relies upon analyzing the free oscillation dynamics of an atomic force microscope cantilever operating in conventional alternating current (AC)-mode on a commercial AFM with custom software and low-cost external hardware. The cantilever oscillation is digitized while a transient such as a voltage pulse or light pulse is triggered to initiate the local dynamics of interest. Importantly, a triggering circuit is employed to phase lock the trigger event to the cantilever motion (see also FIGS. 6A and 6B) so that the trigger always occurs at the same point in the cantilever oscillation, thereby improving the efficacy of signal averaging.

With the excellent signal/noise ratio achievable by averaging, the challenge becomes extracting the interesting dynamic behavior of the system from the cantilever motion. In AC-mode AFM, the cantilever motion can be described as a damped-driven harmonic oscillator. Following a transient perturbation, the force $F_z(t)$ and force gradient dF/dt experienced by the AFM tip may both change in time. These changes in turn alter the harmonic motion of the cantilever. The objective is thus to recover the time profiles of the $F_z(t)$ and/or dF/dt signals of interest from the resulting fast cantilever motion. In principle, with sufficient computational resources and some basic information about the system under investigation, one could attempt to reconstruct the temporal evolution of $F_z(t)$ and dF/dt by numerically integrating the equations of motion and fitting the resulting motion to the real tip data. Practically, we have found it faster and more convenient to employ a simplified data analysis procedure as described below.

As a proof of principle, we first consider detecting transients in a model damped driven harmonic oscillator governed by the classic equation of motion:

$$\frac{d^2z}{dt^2} + 2\beta\frac{dz}{dt} + \omega_0(t)^2 z = (F_0/m)\cos(\omega t) + F_e(t) \quad (1)$$

where z is the tip displacement, $F_0$ is the driving force applied to the cantilever, m is the cantilever mass, $\omega_0$ is the resonance frequency of the cantilever that depends on factors such as the spring constant k and quality factor Q, and $\omega$ is the frequency of the driving force signal applied to the cantilever. $F_e$ is an external force of interest acting on the cantilever that varies with time, and $\beta = \omega_0/2Q$ is the damping factor. Transient changes in the cantilever motion will arise from changes in the both force $F_e$, and its spatial derivative $dF_e/dz$; the latter effectively modifies the spring constant and thus shifts the instantaneous resonance frequency, with the shift $\Delta\omega_0$ being proportional to $(\partial F/\partial z)$.

As exponential decays are among the most ubiquitous signals resulting from small perturbations to a system, we consider a time dependent force F(t) and resonant frequency $\omega_0(t)$ of the form:

$$F_e(t \geq 0) \approx F_e(\infty)[1 - \exp(-t/\tau)] \quad (2)$$

$$\omega_0(t \geq 0) = \omega_0(0) + \Delta\omega_0[1 - \exp(-t/\tau)] \quad (3)$$

After a transient change in $F_e(t)$ and dF/dt (which effects a transient change in $\omega_0$) the system will return to a steady state sinusoidal oscillation with a new equilibrium amplitude and phase on a characteristic timescale $2Q/\omega_0$, or ~3 ms for the cantilevers used here. While one might assume the $2Q/\omega_0$ time might limit the achievable time-resolution, the details of the fast transient motion prior to reaching the new steady state do encode information about τ on much shorter times and thus form the basis for subcycle time resolution. Extraction of this information is a matter of signal processing.

To demonstrate the feasibility of distinguishing different transient rise times or decays on fast timescales we first consider a theoretical damped driven harmonic oscillator governed by equation (1). This form represents the transient expected in many systems of interest, such as the charge accumulation and decay in nanostructured solar cells, and of systems exhibiting first order or pseudo-first order kinetics in general. To analyze the cantilever motion at early times we use numerical demodulation of the digitized cantilever signal and extract the envelope amplitude, instantaneous phase and instantaneous frequency of the oscillating cantilever (details in supplementary information).

Figure 1E:
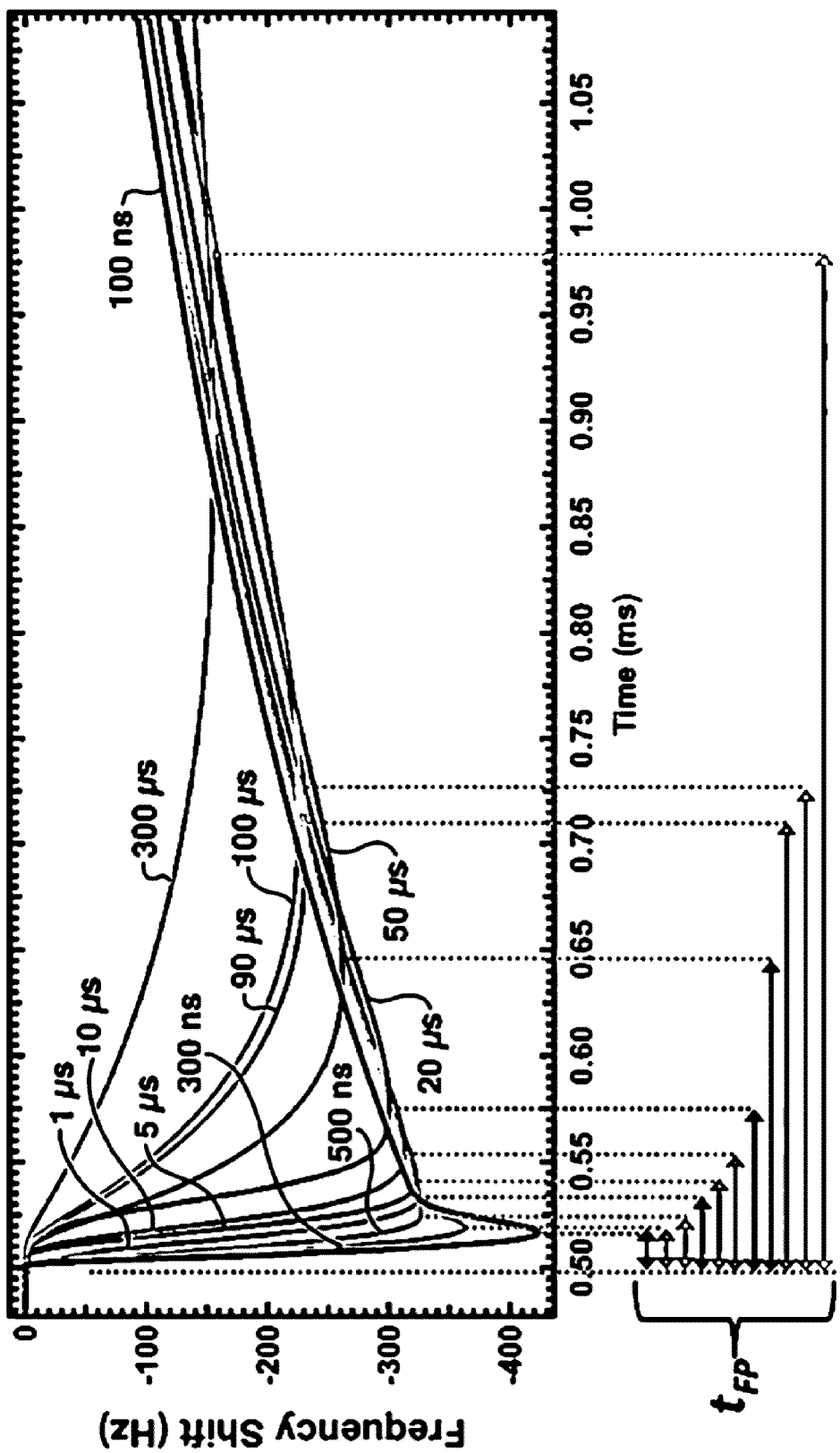
FIG. 1E graphically illustrates instantaneous frequency of simulated cantilever behavior, using realistic cantilever parameters ($\omega_0$=247.329 kHz, Q=363, k=27.7 N/m) with transient perturbations of root exponential form with characteristic time constants from 100 ns to 300 μs, showing the monotonic behavior of $t_{FP}$ with perturbation rise time. Arrows at the bottom illustrate the $t_{FP}$ time.

FIG. 1E shows the instantaneous frequency recovered from a simulated cantilever following a transient change in F(z) and dF/dt according to equations (2)-(3) over 3 orders of magnitude, from 100 ns to 300 μs, while the cantilever parameters such as β, $\omega_0$, $F_e$ and k were chosen to agree with typical AFM experiments. Importantly, FIG. 1E shows that the cantilever oscillation behavior is distinguishable for different $\tau \ll 2Q/\omega_0$ and even for $\tau \ll 1$ cantilever oscillation period. Furthermore, the data suggest a straightforward way to recover τ from an experimental data set. Notably, the time it takes for the instantaneous cantilever frequency to shift farthest from ω before relaxing, hereafter the time to first frequency shift peak ($t_{FP}$), is a monotonic function of τ. Thus, given adequate signal/noise one can in principle measure rise times or decays as short as 200 ns with widely available AFM cantilevers by generating a calibration curve of $t_{FP}$ versus τ.

To demonstrate this method in practice, we use electrostatic force microscopy (EFM) as a test bed. In EFM, the tip and sample form a capacitor structure, and changes in the potential difference between the tip and sample change both the force and force gradient experienced by the oscillating cantilever. We can thus use programmed voltages applied to the tip by an arbitrary waveform generator to provide a model system with which to explore the performance of different data acquisition and analysis methods. Furthermore, since EFM can be used to detect photogenerated charge, time-resolved EFM has practical application in the local detection of charge carrier behavior below the diffraction limit in nanostructured semiconductors.

Figure 2A:
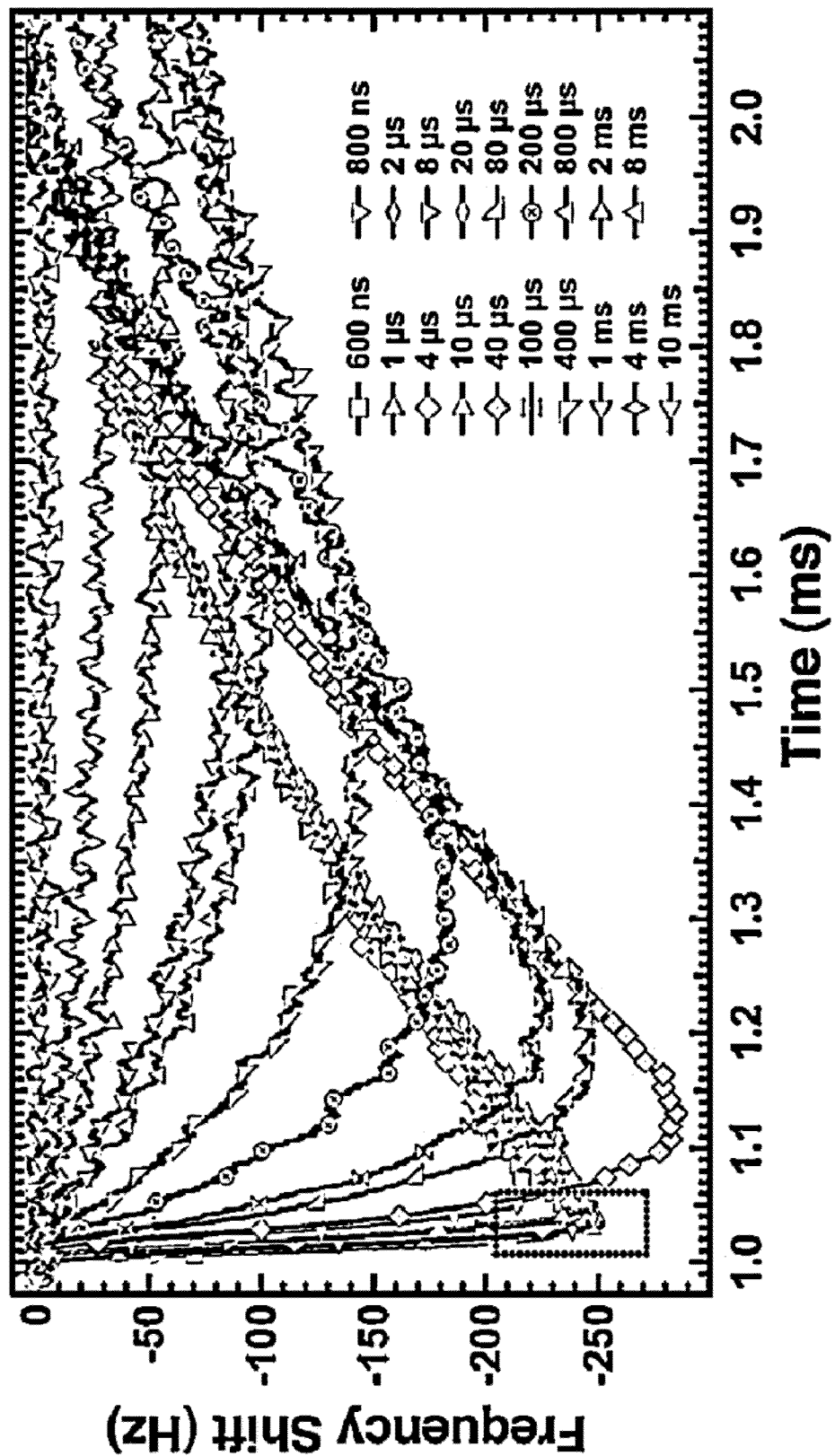
FIG. 2A illustrates instantaneous frequency data following exponentially-shaped voltage pulses with rise times ranging from 600 ns to 10 ms. From 50 μs to 10 ms, as the rise time increases, the net frequency shift generally decreases due to an overlap between transient and steady-state harmonic oscillator behavior, while the $t_{FP}$ consistently increases monotonically. Markers are spaced every 225 samples. Number of averaged pulses N=1250.

FIG. 2A shows the instantaneous frequency obtained from the filtered, demodulated experimental data. A voltage with an exponential rise time was applied at t=1 ms to a Pt-coated cantilever oscillating 10 nm above a Au substrate. As with the simulated data, the cantilever returns to a new steady state oscillation with a new amplitude and phase on a timescale governed by $2Q/\omega_0$. FIG. 2A further shows that, as for the simulated data, the $t_{FP}$ is clearly different for each value of τ. We have further verified that the $t_{FP}$ parameter is insensitive to cantilever lift height (see FIGS. 8 and 9) and can be robustly extracted even at signal/noise levels well below those shown here (see FIG. 10).

Figure 2B:
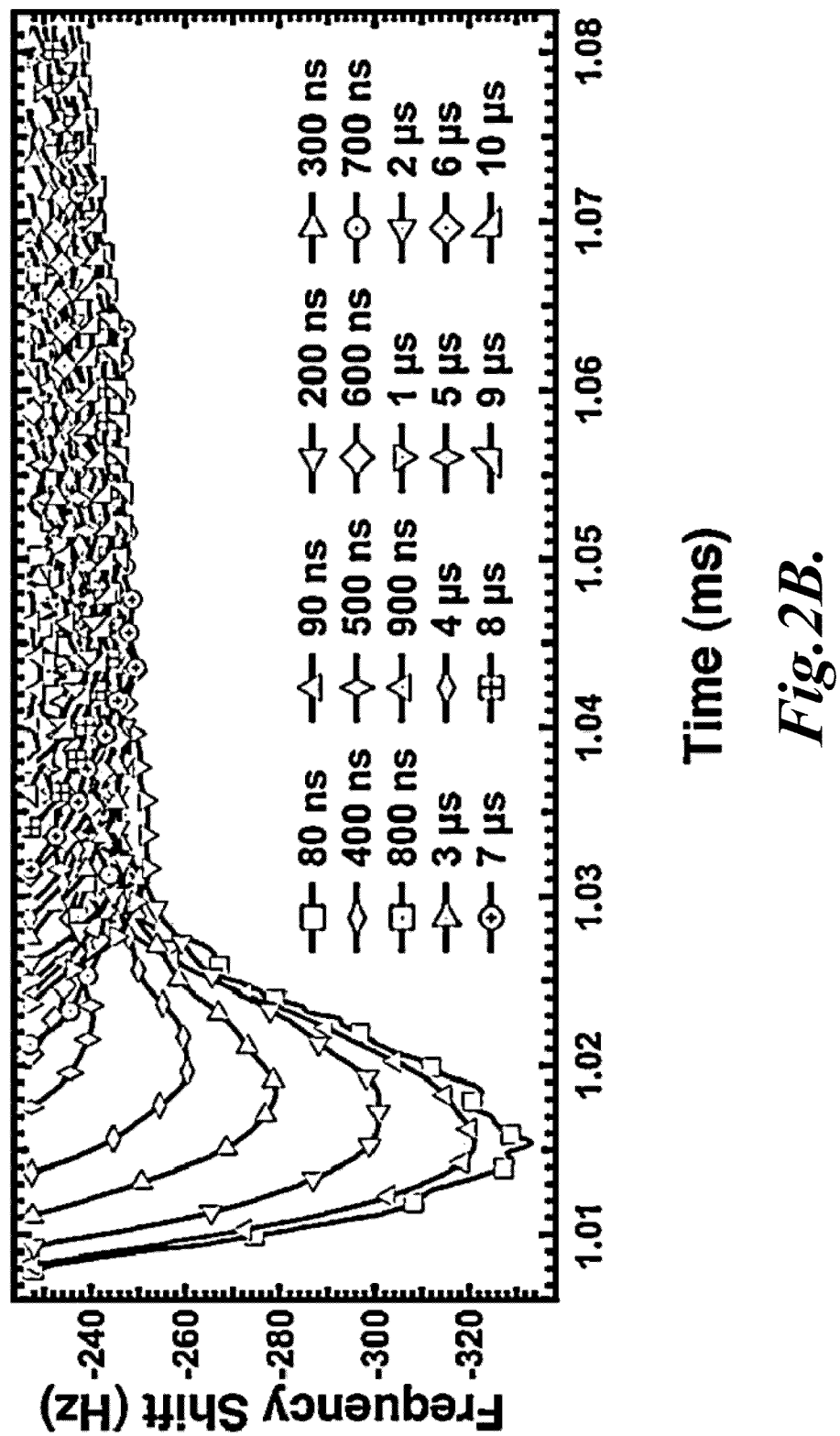
FIG. 2B illustrates data from 80 ns to ~10 μs showing the $t_{FP}$ values decrease monotonically even as the cantilever behavior becomes increasingly complicated at subcycle times. Markers are spaced every 40 samples. Number of averaged pulses N=1250.
Figure 2C:
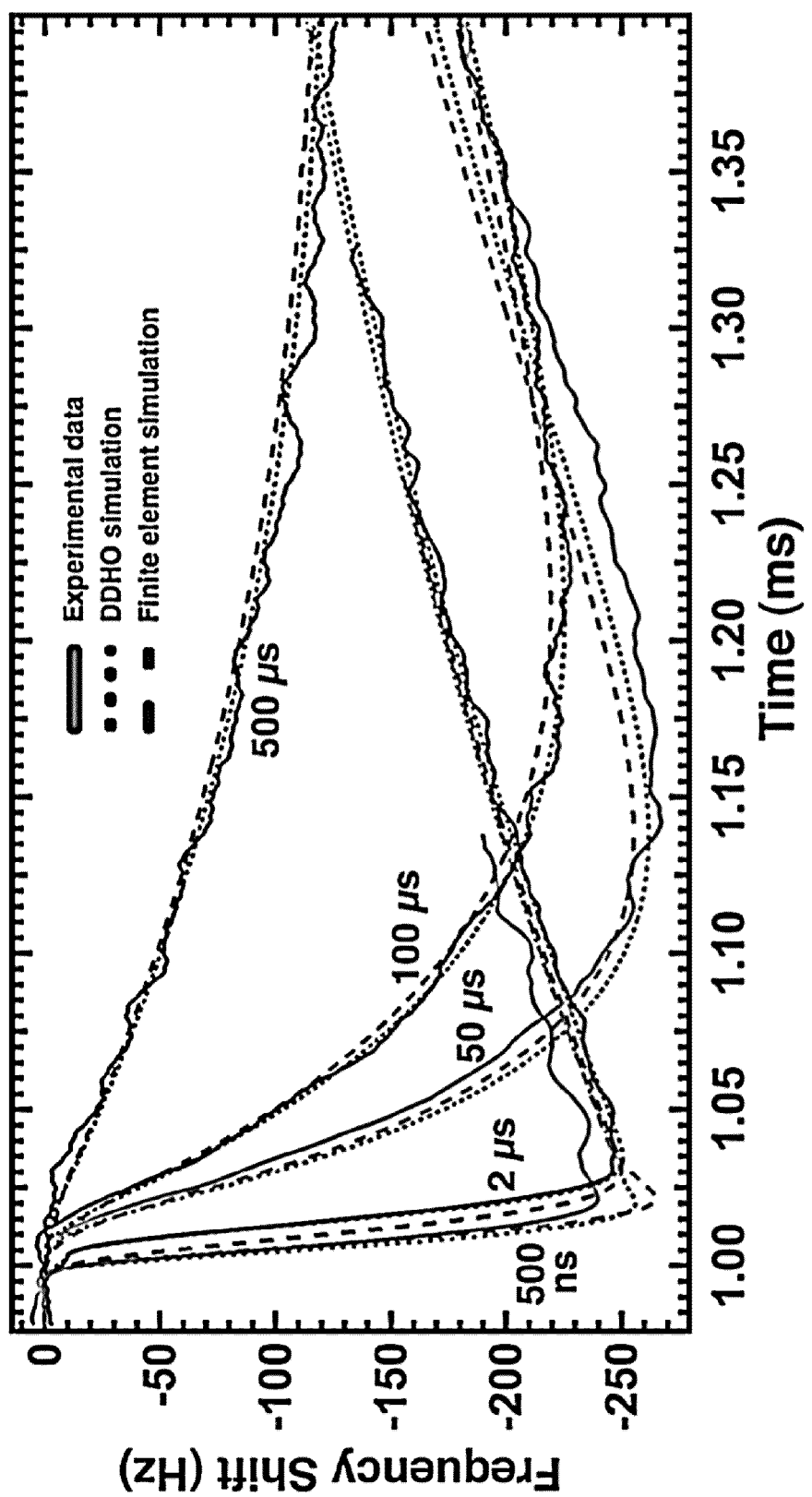
FIG. 2C illustrates comparing damped driven harmonic oscillator (DDHO) simulation (dotted), finite element simulation (dashed), and experimental (solid) instantaneous frequency at different rise times.
Figure 2D:
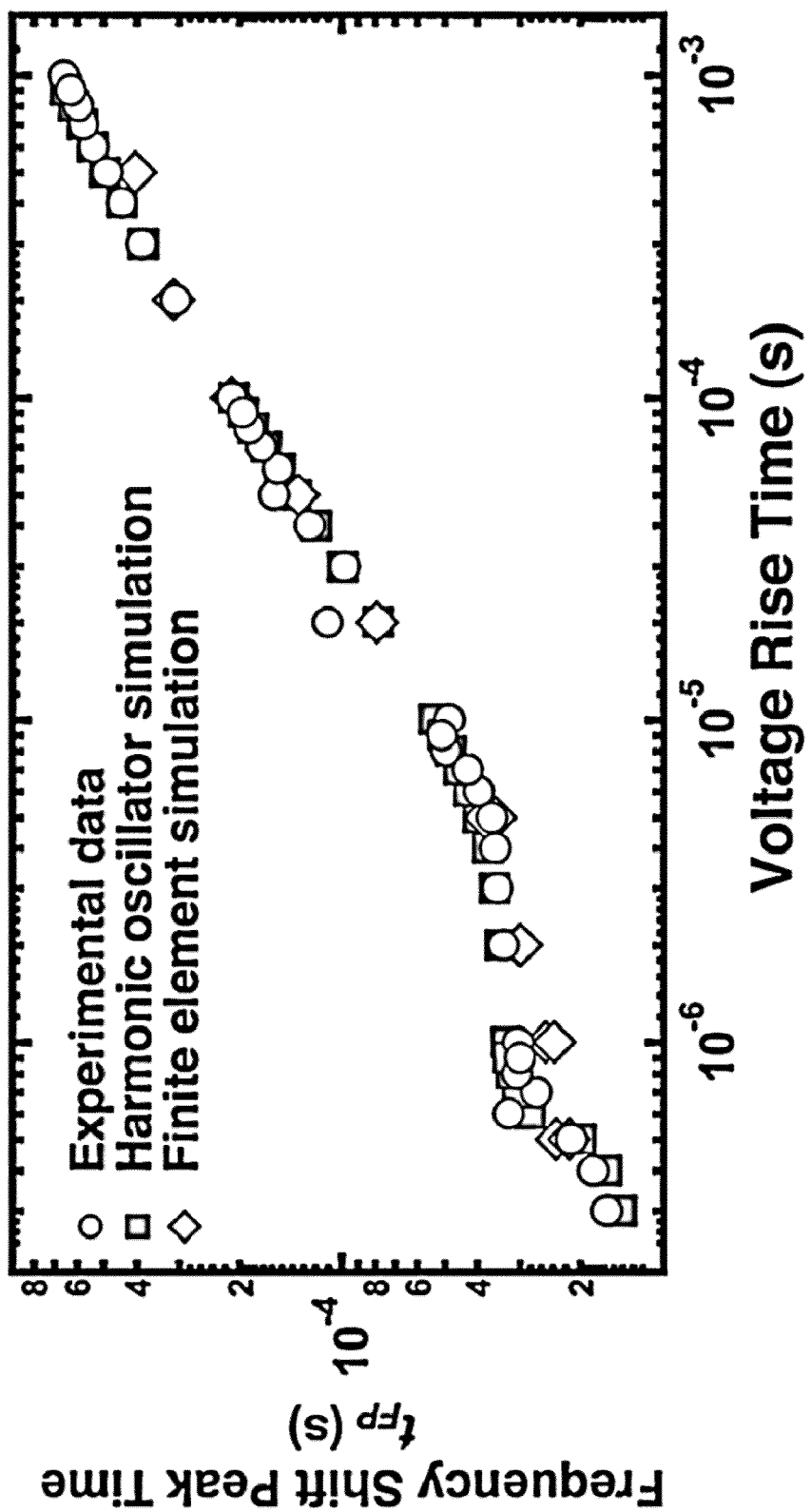
FIG. 2D illustrates $t_{FP}$ data for voltage pulses across four decades of rise times. Experimental data (circles) are compared with the data generated using the modified DDHO equations (squares) and data generated using a finite element model simulation (diamonds) from 500 ns to 800 μs.

Along with the experimental data, FIG. 2B plots instantaneous frequency vs. time for a full finite-element simulation of a conical-shaped tip with the tip-sample force calculated using the Maxwell stress tensor, $F_z = E_z^2 \in_0 \in_r$ where $E_z$ is the electric field in the z direction and r is the radius of the tip at given height, integrated over the tip surface (see also FIG. 7), as well as instantaneous frequency vs. time for a simple damped driven harmonic oscillator using experimentally-derived tip parameters. Notably, both the full finite-element method, and the simple harmonic oscillator model are able to reproduce the data across many orders of magnitude (FIG. 2C). Indeed, there is near quantitative agreement between the simulations and the experimental behavior at rise times from sub-μs to 900 μs. At very short times (<1 μs) the simulations and experimental data show small quantitative deviations, which may be attributable in part to non-ideal tip shape, higher-order force corrections, and cantilever beam contributions. Though the quantitative frequency shift magnitude begins to differ, the $t_{FP}$ value still scales with the rise time, with good agreement between the experiment and different simulation methods (FIG. 2D).

The data in FIGS. 2A-2D are striking. They demonstrate that experimentally, one can use the demodulated frequency to quantify rise or decay times for signals as fast as τ=200-300 ns—shorter than even a single cantilever oscillation period. To our knowledge, this is the fastest mechanically detected signal rise time that has been determined with AFM by orders of magnitude. We emphasize that, while performed with custom hardware and software, the method does not rely on expensive add-on instrumentation or rare custom probes and should therefore be readily accessible to a wide-range of AFM users. Indeed, we envision that with appropriate software modification, current-generation commercial AFMs have the hardware specifications necessary to implement time-resolved AFM with sub-microsecond accuracy.

There are many potential applications of faster time resolution scanning-probe analysis ranging from biophysics to solar energy. Here we demonstrate one example in the field of organic photovoltaics. Previously we have used a feedback-based time-resolved EFM (trEFM) method to study photoinduced charge generation in donor/acceptor polyfluorene copolymer blends used in organic photovoltaics. We have shown that charge accumulation following illumination is well approximated by single-exponential kinetics with the photo-charging rate being directly proportional to the local quantum efficiency and incident light intensity. However, operating under physically relevant (~1 sun) illumination conditions, characteristic charging times (determined by rate the photogenerated charges fill the tip-sample capacitor) are on the order of ~30-50 μs for blends with quantum efficiencies in the range of ~50-70%. In other words, the most interesting nanostructured organic systems such as poly(3-hexylthiophene):phenyl-C61-butyric acid methyl ester (P3HT:PCBM) remained inaccessible.

As a proof-of-concept, we applied FF-trEFM to the well-known polymer:fullerene OPV blend P3HT:PCBM by photoexciting the sample with a light step pulse and detecting the changes in resulting cantilever motion (FIG. 3A). FIG. 3B shows the light intensity-dependence of $t_{FP}$. At lower intensities, it takes longer for the film to become filled with enough photogenerated charge to screen the tip potential (i.e., τ increases), therefore $t_{FP}$ shifts to longer times. The similar behavior from both photoinduced charging and exponential voltage signals lends confidence to our theoretical treatment of FF-trEFM in (1)-(3). Taken together, the two experiments imply that, at the same light intensity, the difference in $t_{FP}$ reflects a difference in force gradient rise time τ, in this case the local charging efficiency.

P3HT:PCBM samples prepared with different thermal annealing times (FIG. 3C), yield dramatically different external quantum efficiencies (EQE) as a function of wavelength, an effect attributed to changes in nanoscale film structure. However, even for the least efficient, unannealed blend classic feedback-based trEFM data are limited by instrument response (see FIG. 5); the shaded region in FIG. 3C shows the approximate EQE range accessible to classic feedback-based trEFM with our hardware.

FIG. 3D shows a plot of $1/t_{FP}$, demonstrating that feedback-free trEFM can readily distinguish the differences between the samples with different EQEs as result from the different annealing times. For these experiments, we performed FF-trEFM and EQE measurements on the exact same organic semiconductor films, which were made into photovoltaic devices. The data in FIG. 3D show that the measured $1/t_{FP}$ (triangles) value averaged over the image is directly proportional to EQE (circles). In fact, the data indicate that FF-trEFM can be used directly to predict the EQE that would be obtained from a photovoltaic device fabricated from a given P3HT/PCBM film morphology.

FIGS. 3E and 3F show a topography (FIG. 3E) and $1/t_{FP}$ image (FIG. 3F) for a film with an average EQE of 54%.

When comparing the distribution of $1/t_{FP}$ times across images of different films, the average and standard deviation of $1/t_{FP}$ both increase with device efficiency as shown in FIG. 3D. This result is consistent with observations of nanoscale short-circuit photocurrent distributions on P3HT:PCBM devices, yet without the complications from tip work function and sample damage that can arise from such measurements, further confirming the utility of the FF-trEFM method.

We predict that FF-trEFM will not only enable studies of charge accumulation in more efficient nanostructured solar cells but will also enable the study of local recombination rates, which often have time constants in the range of 1-100 µs in OPV blends. Since any experiment with a time-dependent force gradient can use FF-trEFM, it should also be possible to utilize these methods in a host of new applications ranging from time-dependent magnetic force experiments to study fast local structural changes in biological samples. Because the method can in principle be implemented on much current generation AFM hardware, we hope it will ultimately become widely accessible.

Sample Preparation.

Au samples were prepared on degenerately-doped n-type Si(100) substrates (Silicon Quest International) with a 1 µm $SiO_2$ layer. The Si substrates were cleaved and sonicated in acetone and isopropyl alcohol prior to evaporation. Au films were formed by evaporating a 2.5 nm Cr adhesion layer followed by 55 nm Au. Au samples were sonicated in acetone and plasma cleaned prior to imaging.

Substrates for the OPV films were 1.5×1.5 $cm^2$ indium tin oxide (ITO)-coated glass substrates (TFD Inc.). Poly(ethylene dioxythiophene):poly(styrene-sulfonate) (PEDOT:PSS, Baytron P) was filtered and heated to 50° C. and deposited on the ITO and annealed at 100° C. for ~1 hour. Poly(3-hexylthiophene):phenyl-$C_{61}$-butyric acid methyl ester (P3HT:PCBM) films were formed from a 1:1 blend of P3HT (Rieke Metals, 90-93% RR) and PCBM (Nano-C, 99.5% pure) in chlorobenzene at ~42 mg/mL. The solution was stirred at 500 RPM at 55° C. overnight and was spin-coated warm onto the substrates at approximately 1500 RPM for 2 min. Aluminum top electrodes (85 nm) were then evaporated, creating devices of approximately 1.8 $mm^2$ based on overlap of ITO and Al electrodes. Films were annealed for various times at 110° C. on a preheated aluminum block mounted on a hot plate. All active layer preparation was in an inert environment, and all films were stored covered in aluminum foil in the glove box until imaged.

Instrumentation.

All FF-trEFM data were acquired using an MFP3D-BIO AFM (Asylum Research). Experiments on Au films were performed in ambient conditions, whereas those on P3HT:PCBM were performed under nitrogen using a closed fluid cell. For the Au data, we applied root exponential voltage pulses using an arbitrary waveform generator programmed via GPIB. For the P3HT:PCBM blends, we illuminated the samples using a 5 W, 523 nm LED (LedEngin LZ1-10G105) focused on the top surface of the film and co-aligned with the tip. Feedback-based trEFM data were acquired similar to that reported in previous work and described above. In each case, the cantilever deflection signal was routed into a triggering box to ensure that each light pulse was applied at the same phase. For voltage pulse tests on Au the same circuit was used as well. The sample was grounded relative to the tip in each case. Device measurements (external quantum efficiency) were performed under vacuum using a monochromated, 75 W Xenon lamp, with eight device pixels per film. External quantum efficiency measurements are from at least 3 batches of devices.

FF-trEFM Measurement.

FF-trEFM experiments were performed using in-house Igor Pro code and C-language XOP code to operate an external digitizer (Gage Compuscope USB 14400) for recording the cantilever motion at typical sample rates of 50 MHz. Prior to signal acquisition, the system was calibrated to ensure a correct translation factor between voltage and cantilever motion. The cantilever signal was averaged over numerous runs, typically 200, to improve the signal quality. Prior to each experimental run we measured the cantilever parameters such as the spring constant, Q, resonance frequency shift both with voltage and with applied light, and electrostatic force in order to properly model the motion (see Table 1). We changed the drive frequency applied to the cantilever and monitored the amplitude both before and after applying a voltage to the tip (to acquire the approximate electrostatic force) and before and, on P3HT:PCBM films, after applying light with the tip at a fixed voltage to acquire the approximate frequency shift and force due to photoinduced charging. DDHO simulations were performed using Igor Pro. Finite element method simulations were performed using COMSOL.

Cantilever Behavior in Response to Force Gradient Changes.

The cantilever in AFM behaves as a typical damped driven harmonic oscillator (DDHO), whose behavior is described by the well-known equations:

$$z(t < 0) = A\cos(\omega t - \delta) \quad (4)$$

$$A = \frac{(F_0/m)}{\sqrt{(\omega_0^2 - \omega^2)^2 + 4\omega^2\beta^2}} \quad (5)$$

$$\delta = \tan^{-1}[2\omega\beta/(\omega_0^2 - \omega^2)] \quad (6)$$

where A is the amplitude, δ is the phase of the cantilever relative to the driving signal, $F_0$ is the driving force applied to the cantilever, m is the cantilever mass, $\omega_0$ is the resonance frequency, ω is the frequency of the driving force signal applied to the cantilever, $F_e$ is the electrostatic force due to the charging of the surface, and $\beta=\omega_0/2Q$ is the damping factor. When the drive frequency $\omega=\omega_0$, the amplitude and phase are at a peak and at π/2 respectively. As the resonance frequency We measure the electrostatic force and cantilever properties by measuring the free cantilever parameters far from the surface (10 µm) and at a given lift height close to the surface (10 to 100 nm). The tip is then moved to the specified lift height, and the cantilever amplitude, phase, and deflection are recorded. This procedure is repeated several times and the curves are averaged together. For the OPV films, the voltage is held constant and the light is turned on to effect a change in the electrostatic force/force gradient.

FIG. 4 relates to resonance frequency response to changes in the electrostatic force gradient. (A) Cantilever oscillation amplitude curves on an organic photodiode (PFB:F8BT) taken at 0 V (black), 10 V (blue), and 10 V under 405 nm illumination (pink), across a range of drive frequencies. (B) Example frequency shift response showing the expected quadratic dependence on applied voltage as well as the change in differential capacitance gradient due to illumination. Data taken at 10 nm above the same sample with approximately 1590 $W/m^2$ intensity.

Figure 4A:
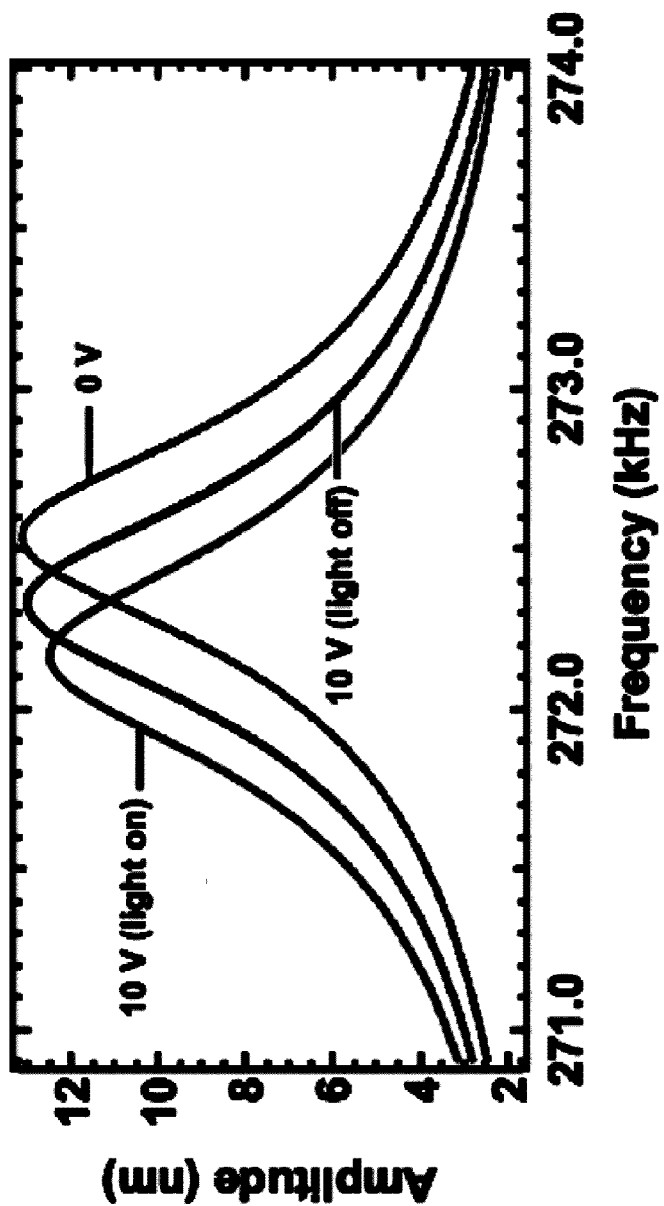
FIG. 4A graphically illustrates cantilever oscillation amplitude curves on an organic photodiode (PFB:F8BT) taken at 0 V, 10 V, and 10 V under 405 nm illumination, across a range of drive frequencies.
Figure 4B:
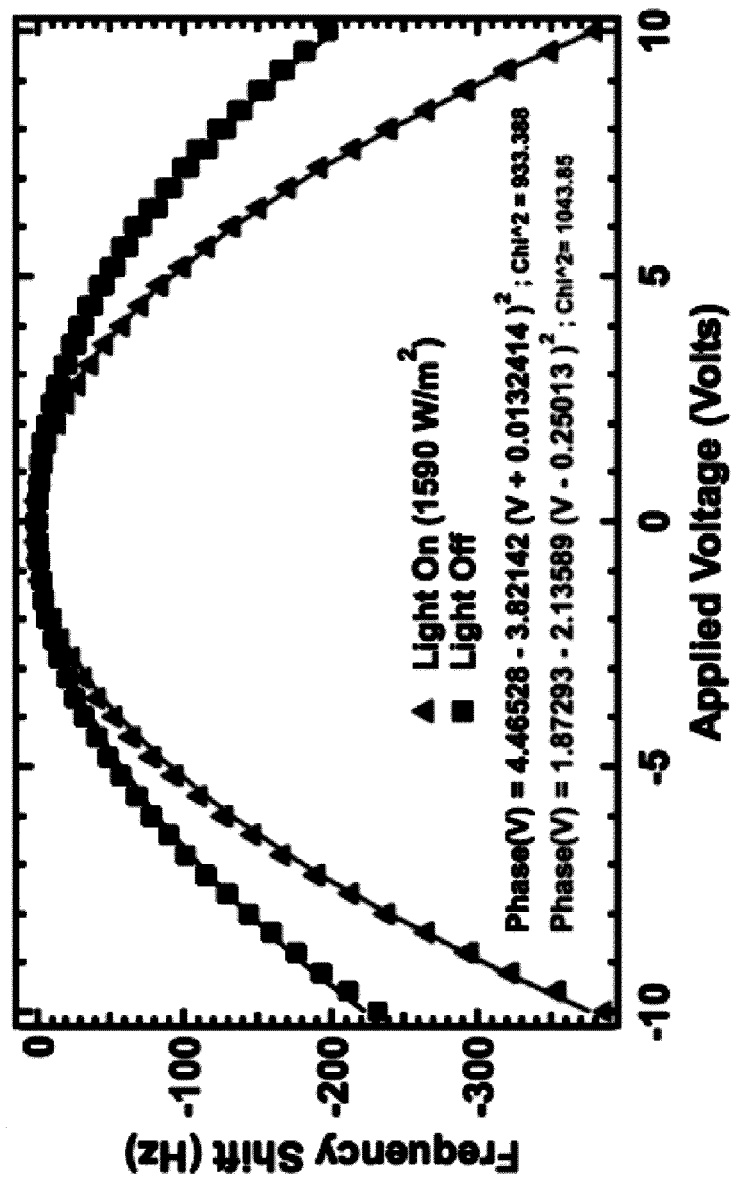
FIG. 4B graphically illustrates frequency shift response showing the expected quadratic dependence on applied voltage as well as the change in differential capacitance gradient due to illumination. Data taken at 10 nm above the same sample with approximately 1590 W/m² intensity.

FIG. 4A shows how the amplitude of the AFM cantilever behaves with no voltage, an applied voltage, and an applied voltage and constant illumination on a poly(9,9'-dioctylfluorene-co-bis-N,N'-(4-butylphenyl)-bis-N,N'-phenyl-1,4-phenylenediamine:poly-(9,9'-dioctylfluorene-co-benzothiadiazole) (PFB:F8BT) film at a height of 20 nm above the sample. The amplitude decreases and the resonance frequency peak shifts to a lower frequency as $\partial^2 C/\partial z^2$ changes increasingly by first applying a voltage and then by adding the photogenerated charges. Under illumination, $\partial^2 C/\partial z^2$ increases and therefore the curvature in the parabola increases as shown in FIG. 4B.

From the cantilever amplitude, phase, and deflection signals recorded across a range of drive frequencies before and after excitation, we can extract the relevant system parameters such as Q, β, k, amplitude, force, and resonance frequency. An example is shown in Table 1 below. Table 1 relates to cantilever parameters for the system in FIG. 4. The data taken at 10 nm in FIG. 4 show how the Q, resonance frequency, and spring constant all decrease. The net electrostatic force is much larger from turning on the voltage than from turning on the light. LED power is ~1590 W/m². AMPINVOLS and DEFINVOLS are the inverted optical lever sensitivity settings for converting an amplitude and deflection signal from V to nm.

TABLE 1

Cantilever parameters for the system in FIG. 4A.

| Calibration Parameters | 10 μm, 0 V | |
|---|---|---|
| Thermal Resonance Frequency (Hz) | 272614 | |
| Thermal Spring Constant (N/m) | 22.807 | |
| DEFINVOLS (m/V) | 4.5273E−08 | |
| AMPINVOLS (m/V) | 4.9348E−08 | |
| Mass (kg) | 7.7758E−12 | |
| Q Factor | 475.107 | |
| Beta (/s) | 1802.35 | |
| Electrostatic force gradient dF/dZ (N/m) | −3.38189 | |

| | 10 nm, 0 V (Dark) | 10 nm, 10 V (Dark) | 10 nm, 10 V (LED on) |
|---|---|---|---|
| Resonance Frequency (Hz) | 272544 | 272325 | 272164 |
| Amplitude (m) | 1.3143E−08 | 1.3022E−08 | 1.2508E−08 |
| Q Factor | 427.578 | 421.701 | 406.168 |
| Beta/Damping (/s) | 2002.49 | 2028.77 | 2105.11 |
| Driving Force (N) | 7.0103E−10 | 7.0314E−10 | 7.0152E−10 |
| Spring Constant (N/m) | 22.807 | 22.7704 | 22.7804 |

| | 10 V versus 0 V | 10 V, LED Off versus On |
|---|---|---|
| Net Electrostatic Force (N) | 9.8038E−09 | 2.1314E−09 |
| Net Frequency Shift (Hz) | −219 | −159 |
| Change in Spring Constant (N/m) | −0.0366372 | −0.0266255 |
| Change in Peak Amplitude (nm) | −1.2077E−10 | −5.0787E−10 |

The net electrostatic force $F_e$ is significantly higher for just applying the voltage versus no voltage (~9.8 nN) than for having the light on versus off (~2.1 nN). This is consistent with the observation in FIG. 3B where the net frequency shift is smaller for the light than just turning on the voltage. The other factors scale as expected: Q decreases with voltage and again with light as the increase in $F_e$ induces a stronger electrostatic attraction and thus more damping, and the spring constant decreases due to the change in electrostatic force gradient.

Limitation of Feedback-Based Methods.

Figure 5A:
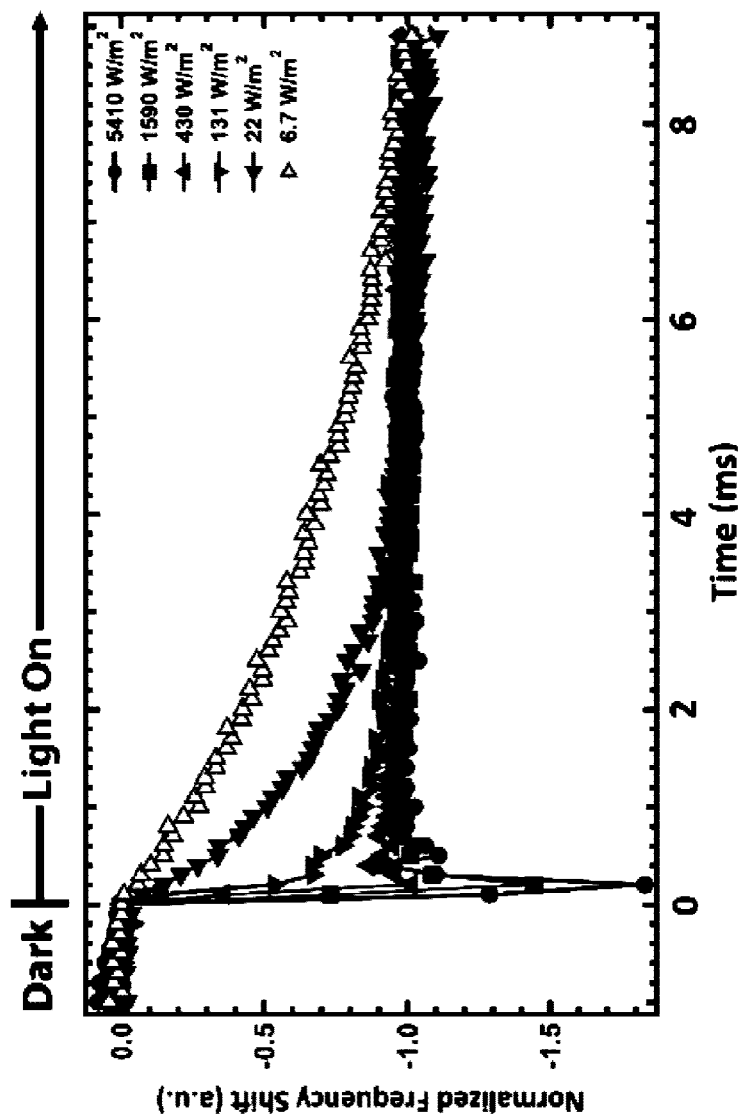
FIG. 5A illustrates typical normalized classic trEFM data curves of the same PFB:F8BT organic photovoltaic sample, showing the time-resolved behavior in the frequency shift. As the intensity increases the frequency shift response resembles a step function due to the time resolution limit, with ringing due to the feedback circuit, in this case occurring at an incident 405 nm LED intensity of ~430 W/m².
Figure 5B:
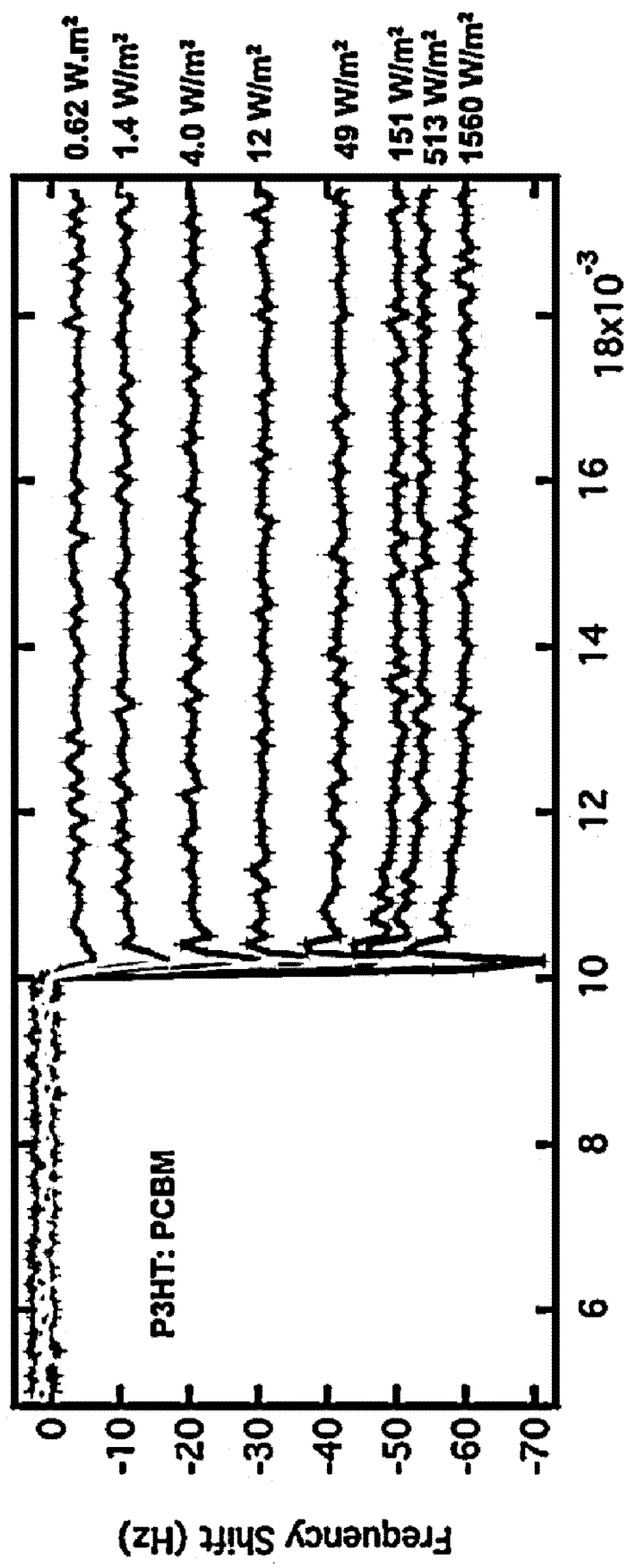
FIG. 5B: for an efficient organic photovoltaic (OPV) blend, P3HT:PCBM, saturation occurs even at intensities as low as <1 W/m² using a 532 nm LED in this case.
Figure 5D:
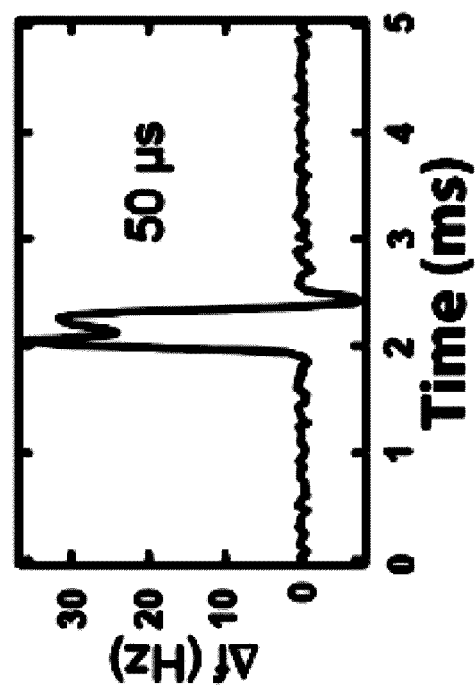
Figure 5C:
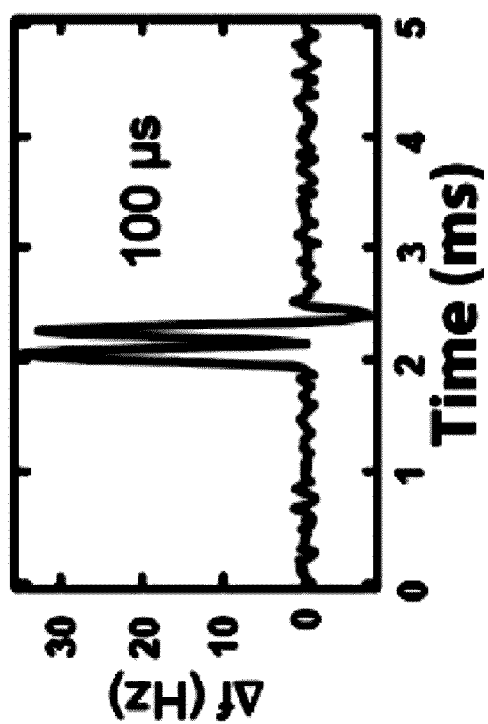

Classic time-resolved electrostatic force microscopy (trEFM) uses a feedback-based method to track the change in resonance frequency. We discuss above how this is limited to a time-resolution of ~100 μs. In a typical organic photovoltaic film such as PFB:F8BT, prepared using a method similar to that reported previously by our group, the charging rate of the film scales with the light intensity. This effect is shown in FIG. 5A, as the incident light intensity increases the change in ∂F/∂z, the change in Δω increases until becoming a step function when the limit of the feedback electronics is reached, as evidenced by the trEFM data taken at light intensities beyond ~430 W/m². For an efficient blend like P3HT:PCBM, the behavior is different (possibly due to higher charge carrier mobility than in PFB:F8BT) but Δω changes as a step function even at low light intensities of <1 W/m² (FIG. 5B). The time resolution limit can be determined by using consecutive voltage pulses and observing the point at which they can be distinguished, as in FIGS. 5C and 5D. Through consecutive voltage pulses, it is possible to determine the lower limit of approximately 100 μs for the old trEFM method, wherein FIG. 5C illustrates the distinction of consecutive voltage pulses using the embodiments provided herein and FIG. 5D illustrates the same frequency of voltage pulse using a traditional time-resolved electrostatic force microscopy system, which cannot distinguish consecutive pulses as quickly as those of the embodiments provided herein (i.e., FIG. 5C).

FIG. 5 relates to limits of time-resolution by feedback-based trEFM. (A) Typical normalized classic trEFM data curves of the same PFB:F8BT organic photovoltaic sample, showing the time-resolved behavior in the frequency shift. As the intensity increases the frequency shift response resembles a step function due to the time resolution limit, with ringing due to the feedback circuit, in this case occurring at an incident 405 nm LED intensity of ~430 W/m². (B) For an efficient OPV blend, P3HT:PCBM, saturation occurs even at intensities as low as <1 W/m² using a 532 nm LED in this case. (C and D) Through consecutive voltage pulses, it is possible to determine the lower limit of approximately 100 μs for the old trEFM method.

Additional Instrumentation/Data Acquisition.

The data were acquired using the schematic shown in FIGS. 1C and 3A. The tip is actuated using the drive signal with frequency ω to shake the tip. At the same time, the MFP3D hardware is used to bias the tip (usually at 10 V). The deflection signal is fed into a trigger circuit. The circuit consists of a comparator and a D-flip flop, wherein the input deflection signal (after DC filtering) becomes a clock signal for the D-flip flop. The trigger signal is only passed at, approximately, the positive zero-crossing of the deflection signal; the phase can conceivably be changed depending on the reference signal sent to the comparator. The subsequent locked trigger is then used to simultaneously power the LED and to trigger the digitizer. The LED, with a peak wavelength at 405 nm or 523 nm, is optionally attenuated via neutral density filters and focused through an objective onto the top surface of the sample.

The deflection signal is averaged by taking numerous runs, typically 1000 to 1250 for point scans and 6 per pixel for imaging, typically at sample rates of 50 MHz and 5 MHz, respectively. Without the circuitry, there is significant noise in the resulting averaged wave of +/−a cycle, as in FIGS. 6A (unlocked) and 6B (locked). The triggering circuit ensures that each wave is acquired at the same point and eliminates this time-resolution bottleneck.

FIGS. 6A and 6B relate to using a phase-detecting circuit improves time resolution. Consecutive digitized deflection waves showing significant jitter without (FIG. 6A) and with (FIG. 6B) a triggering circuit. The circuit ensures that the voltage and light are applied at the same point in the cycle, thus improving averaging by eliminating the averaging errors that can occur in the unlocked trigger case.

Data Processing.

The averaged deflection signal z(t) is filtered using a software finite impulse response bandpass filter and a standard Blackman windowing function. The filtering does not adversely affect the $t_{FP}$ as long as the bandpass window contains a sufficient number of coefficients. Furthermore, to preserve the integrity of the step response, particularly for fast perturbations, we use a causal form of the filter with limited time shift. For the frequency curves plotted in, for example, FIG. 1E in the main text, the data are only shifted in time by ~10 μs. Using a standard noncausal filter results in no such shift at the expense of blurring the start time of the resulting pulse.

The envelope amplitude A(t) and the instantaneous phase θ(t) are digitally extracted through a standard software Hilbert Transform demodulation. Functionally, the Hilbert Transform phase shifts a signal by π/2; by combining the original signal u(t) with the phase-shifted signal û(t) it is possible to acquire A(t) and θ(t), and subsequently the instantaneous frequency f(t) through these equations $$A(t) = \sqrt{u(t)^2 + \hat{u}(t)^2} \quad (7)$$

$$\theta(t) = \tan^{-1}[-\hat{u}(t)/u(t)] \quad (8)$$

$$f(t) = \frac{1}{2\pi}\frac{d}{dt}\theta(t) = \frac{1}{2\pi}\frac{d}{dt}[\tan^{-1}[-\hat{u}(t)/u(t)]] \quad (9)$$

For an arbitrary sinusoidal signal of the form A(t)exp [j(ωt+δ)], θ(t)=ωt+δ.

However, in our case the signal δ is really δ(t), and it is the signal of interest as it is the phase offset from the drive signal. The behavior of δ(t) reflects how the resonance frequency $\omega_0(t)$ changes, so to isolate this we simply subtract ωt from the θ(t) signal. The resulting instantaneous frequency shift is therefore dθ(t)/dt=dδ(t)/dt.

The value of $t_{FP}$ involves finding the lowest value of the f(t) wave. We fit a polynomial curve the lowest frequency peak in the demodulated f(t) to find this value; the purpose of the curve is not physical in origin, it is to extract a value from the f(t). For the imaging data we take multiple images over the same location and average the waves at each location to reduce signal:noise. The resulting image is median-filtered to reduce the noise effects; this does not change the average value reported in FIG. 3D and primarily eliminates erroneous low-$t_{FP}$ values that can be detected.

While there are certainly other ways to probe the system (the time it takes for the phase of the signal to initially change, for example, or the time for the system to shift some set frequency from the drive), the choice of using $t_{FP}$ is deliberate after numerous tests found this metric to be the most robust to sample drift, tip condition, and lift height.

Finite Element Simulations.

Figure 7:
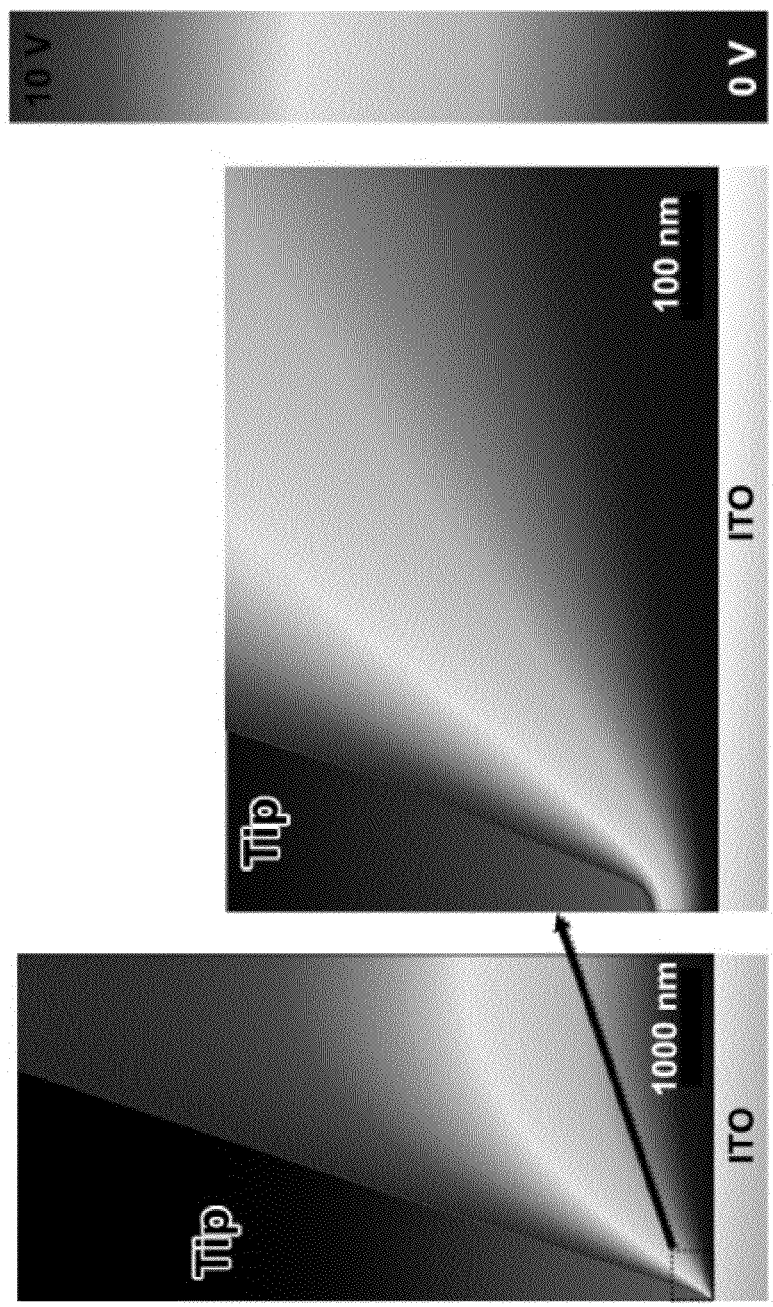
FIG. 7: Numerically calculated electrostatic potential maps (z-component) of the tip-sample junction, where the sample and tip are metals (such as Pt (left) and indium tin oxide (right), respectively).

The tip response is also numerically simulated with COMSOL. Tip geometry is modeled with 2D axis geometry, as shown in FIG. 7. The left side is the symmetry axis, upper boundary is the bottom of the cantilever and tip, the lower boundary is top of sample surface, area in between represents air. The tilted line revolves around the axis to form tip geometry, radius of the tip is 25 nm. The tip length and width are set to 6 μm and 1 μm, respectively. These are smaller than actual values (cantilevers used are typically 15 μm tall) and we do not include the full beam. The rationale behind this is that a predominately large portion of electric force is from the tip while the bulk of the tip and we therefore balance computation time with simulation accuracy.

FIG. 7 relates to numerical simulations of the tip-sample system. Electrostatic potential maps (z-component) of the tip-sample junction, where the sample and tip are metals (such as Pt and indium tin oxide, respectively).

Movement of tip is governed by the DDHO equations, and the time-dependent electric force between the tip and sample is calculated with the Maxwell stress tensor as discussed in the main text. In each time step of the simulation, the tip position is recalculated using the harmonic oscillation as well as the effect of force via the Maxwell stress tensor.

FF-trEFM Data with Variations in Lift Height.

The frequency shift is proportional to the force gradient and therefore decreases with as the tip moves farther from the surface. However, FIG. 8 indicates that the $t_{FP}$ does not vary considerably when the lift height is changed. The dashed lines (50 nm) show approximately the same $t_{FP}$ value as the solid lines (10 nm) when looking at the intersection of the $t_{FP}$ lines with the respective curves.

Figure 8:
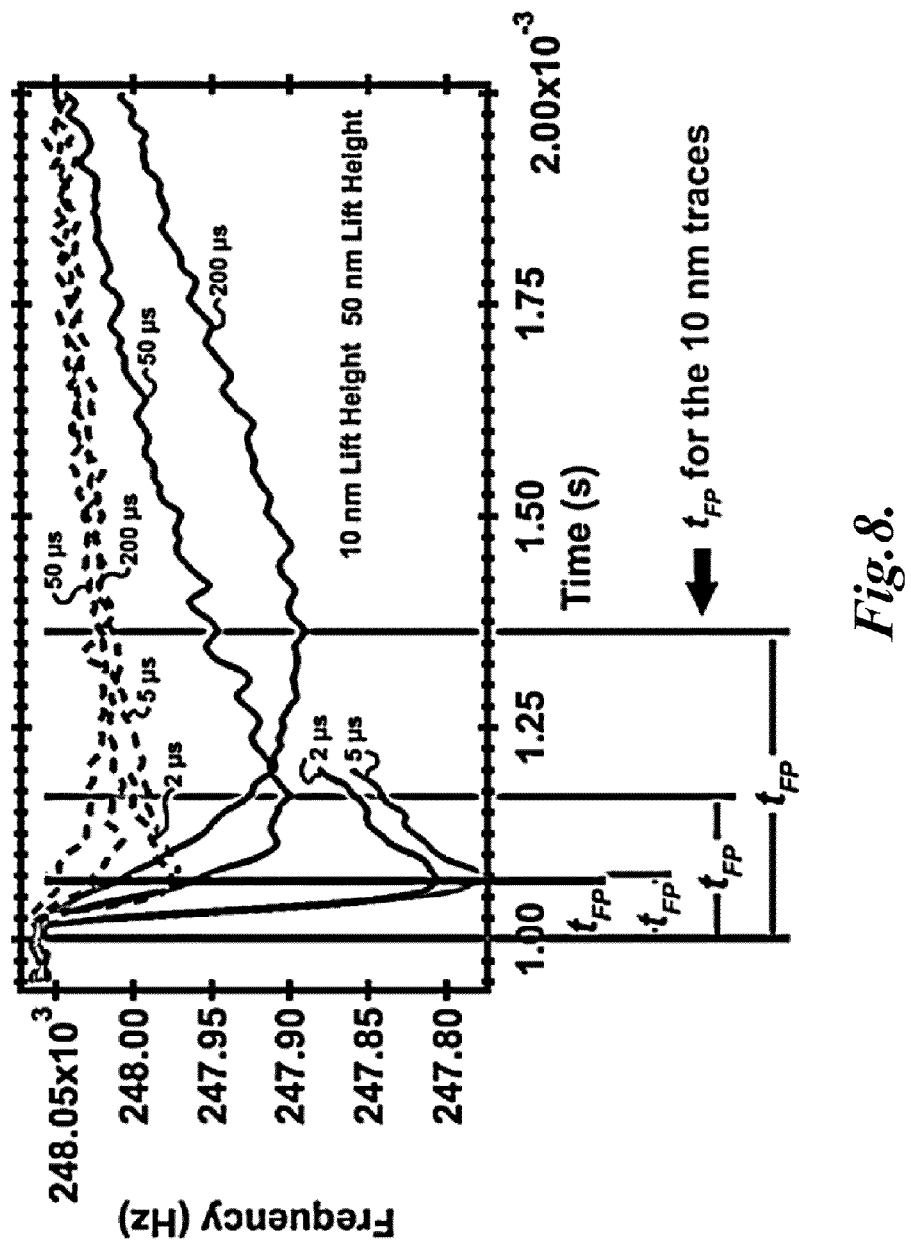
FIG. 8: At four different voltage pulse rise times taken at 10 nm (solid) and 50 nm (dashed) lift heights, the $t_{FP}$ values are approximately the same. These data indicate that the $t_{FP}$ metric is robust against vertical drift effects unlike metrics used in steady-state EFM such as frequency shift magnitude.

FIG. 8 relates to lift height dependence of $t_{FP}$ values. At four different voltage pulse rise times taken at 10 nm (solid) and 50 nm (dashed) lift heights, the $t_{FP}$ values are approximately the same. These data indicate that the $t_{FP}$ metric is robust against vertical drift effects unlike metrics used in steady-state EFM such as frequency shift magnitude.

Figure 9:
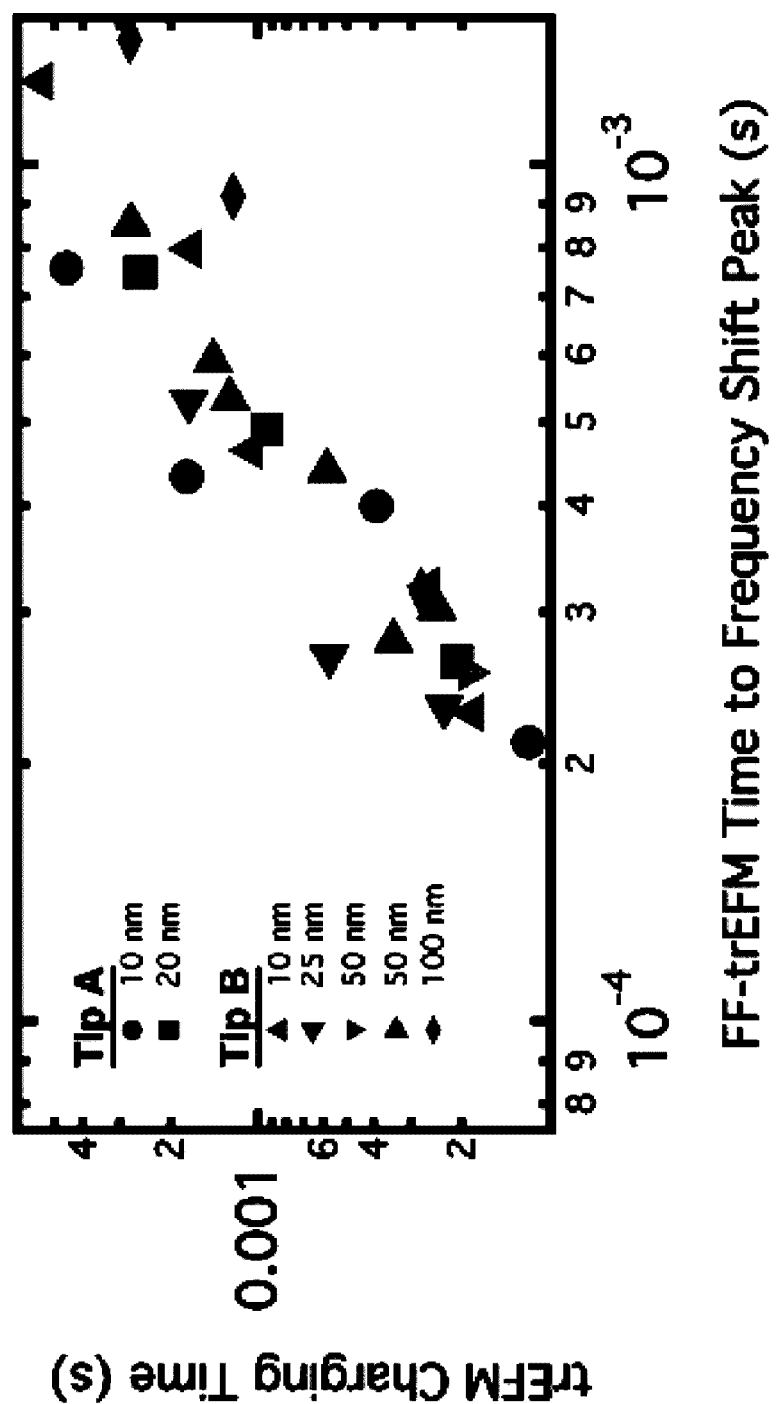
FIG. 9: Data were acquired at several lift heights and light intensities (405 nm LED, intensities range from 1560 W/m² to 1.4 W/m²) with two different tips. As expected, there is a correlation between the classic charging time (y-axis) and $t_{FP}$ value (x-axis) and both techniques are fairly robust to lift height variations given that the data points fall on the same general trendline.

FIG. 9 shows the monotonic link between $t_{FP}$ and charging rate time for a PFB:F8BT film with two different tips. Below 100 nm lift heights, most of the data fall along the same trend line. At 100 nm, it is possible that as the distance increases the electrostatic force is no longer dominated by the intense field at the apex but rather is a sum of the tip apex, the conical tip structure, and the cantilever beam. Additionally, the signal-to-noise is much lower as the lift height increases due to the smaller net frequency shift. We find that using 10 to 50 nm for the lift height is optimal.

FIG. 9 relates to lift height data comparing FF-trEFM and feedback-based trEFM on a PFB:F8BT film. Data were acquired at several lift heights and light intensities (405 nm LED, intensities range from 1560 W/m² to 1.4 W/m²) with two different tips. As expected, there is a correlation between the classic charging time (y-axis) and $t_{FP}$ value (x-axis) and both techniques are fairly robust to lift height variations given that the data points fall on the same general trendline.

Voltage Dependence of $t_{FP}$.

Figure 10:
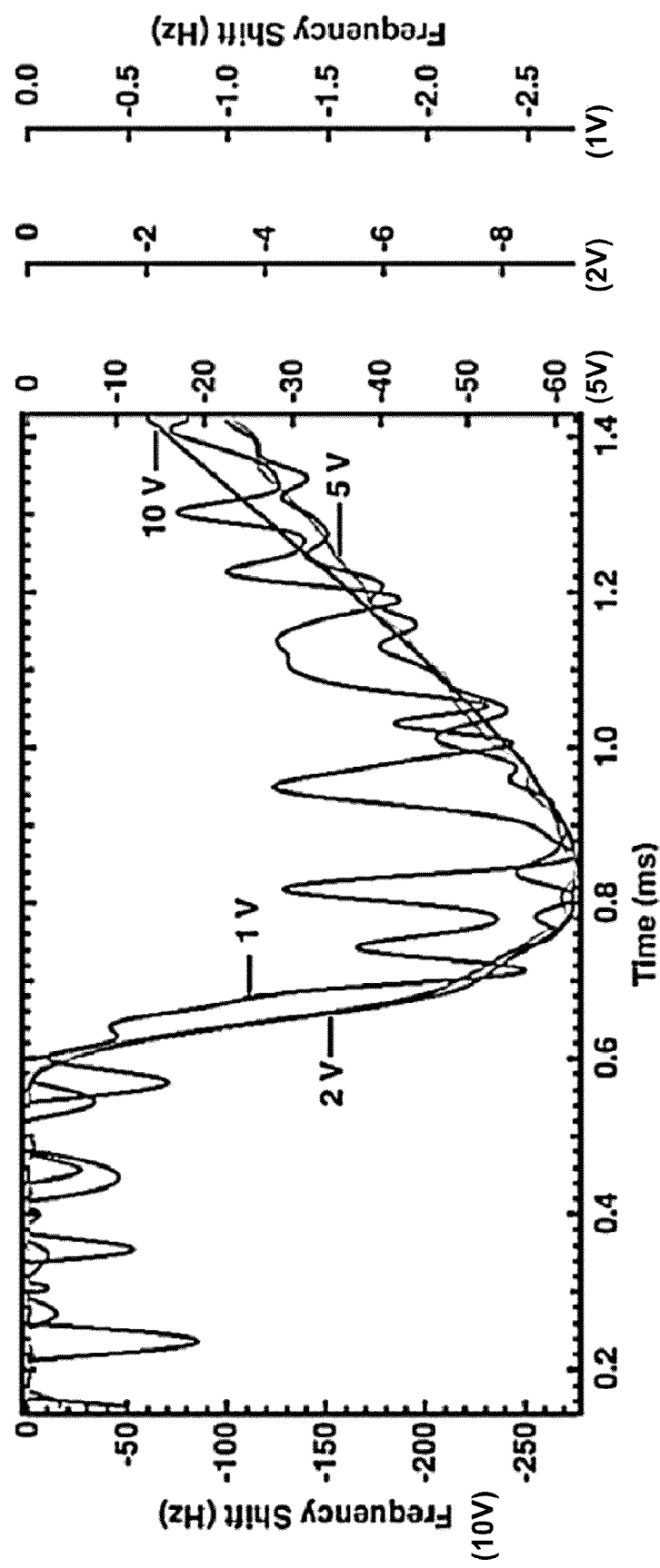
FIG. 10: The instantaneous frequency is shown for a 150 μs rise time voltage pulse with four different voltages: 10 V, 5 V, 2 V, and 1 V. The $t_{FP}$ value is approximately the same in that the instantaneous frequency trend is consistent the same across all voltages. The signal:noise varies with $\Delta V^2$, therefore at 1 V the frequency data are significantly noisier, yet the trend is still observable for a frequency shift of only ~2.8 Hz versus a drive frequency of 248.603 kHz.

We can use averaging to measure signals at low signal: noise. In FIG. 10, we change the voltage while keeping other parameters the same and monitor the instantaneous frequency. Because frequency shift scales $V^2$, decreasing the applied voltage from 10 V to 1 V causes the net frequency shift to go from ~280 Hz (black) to ~2.8 Hz (blue) with a signal:noise level reduced by ~99%. However, the $t_{FP}$ values are approximately constant as can be observed by the overlapping behavior of the frequency curves at various voltage levels, meaning that we can use FF-trEFM processing for signals operating near, for example, the typical $V_{OC}$ level in a photovoltaic cell.

FIG. 10 relates to instantaneous frequency with changes in applied voltage. The instantaneous frequency is shown for a 150 μs rise time voltage pulse with four different voltages: 10 V, 5 V, 2 V, and 1 V. The $t_{FP}$ value is approximately the same in that the instantaneous frequency trend is consistent the same across all voltages. The signal:noise varies with $\Delta V^2$, therefore at 1 V the frequency data are significantly noisier yet the trend is still observable for a frequency shift of only ~2.8 Hz versus a drive frequency of 248.603 kHz.

Force and Force-Gradient Dependence in FF-trEFM.

In FIG. 2D, the $t_{FP}$ vs. voltage rise time behavior seems to exhibit a change in behavior right around the single cycle time (~4 µs for a 250 kHz cantilever) and below. However, we hypothesize that this effect is due to a combination of at least three interrelated factors: (1) the magnitude of the electrostatic force $F_e$, (2) the magnitude of the frequency shift and therefore the magnitude of the change in force gradient, $\Delta\partial F/\partial z$, (3) well-known Gibbs ringing phenomenon that is a side effect of using the Hilbert transform to extract information from a step function. We minimize (3) by oversampling at significantly beyond the Nyquist level and through, if necessary, upsampling the data in postprocessing. However, it is unavoidable particularly as filtering out high-frequency noise inevitably removes harmonics needed to recreate a step function.

Figure 11A:
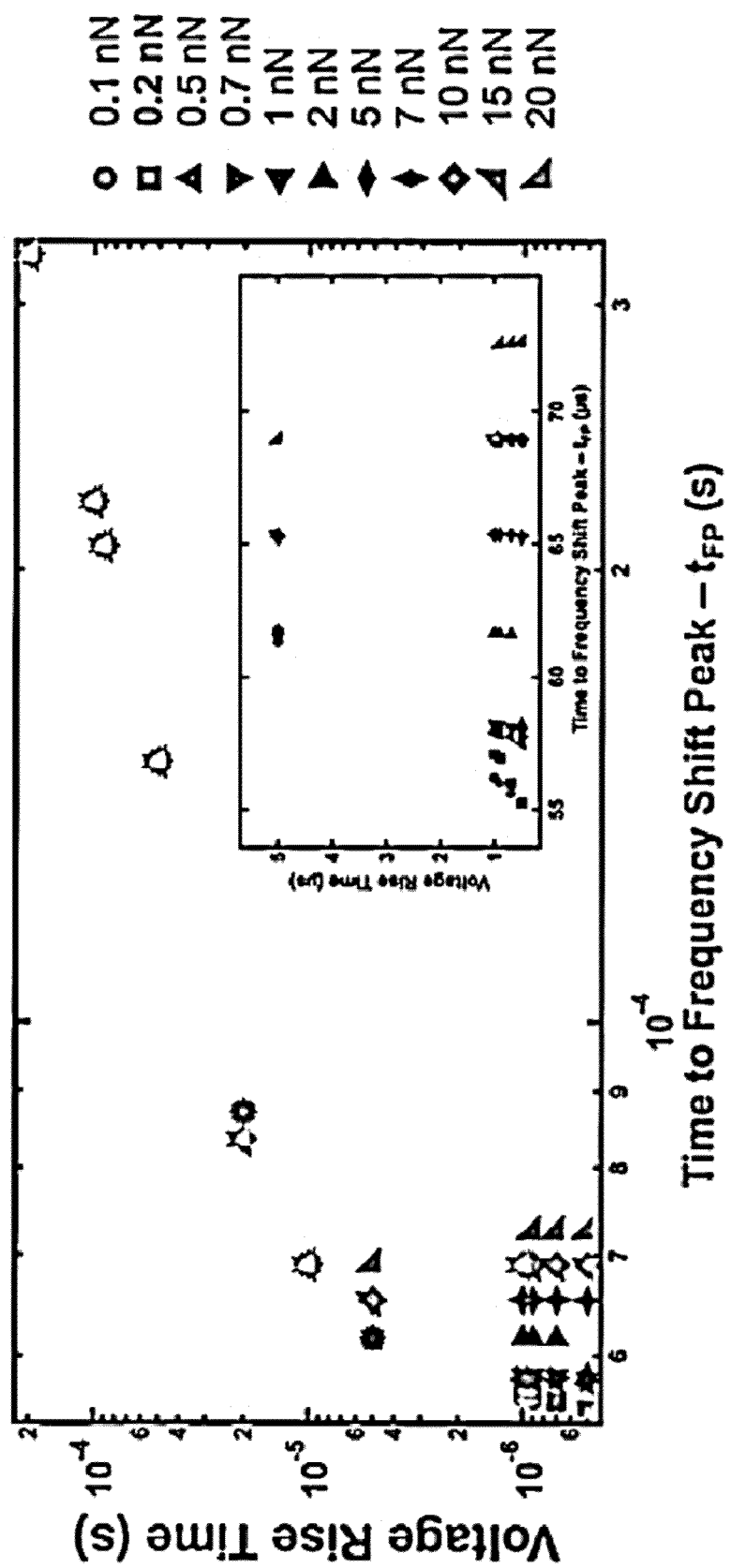
FIGS. 11A and 11B illustrate the effect of electrostatic force and force gradient on sub-cycle time resolution. Simulated data using root exponential voltage pulses by sweeping either (FIG. 11A) the electrostatic force or (FIG. 11B) the net frequency shift (effectively the change in electrostatic force gradient).
Figure 11B:
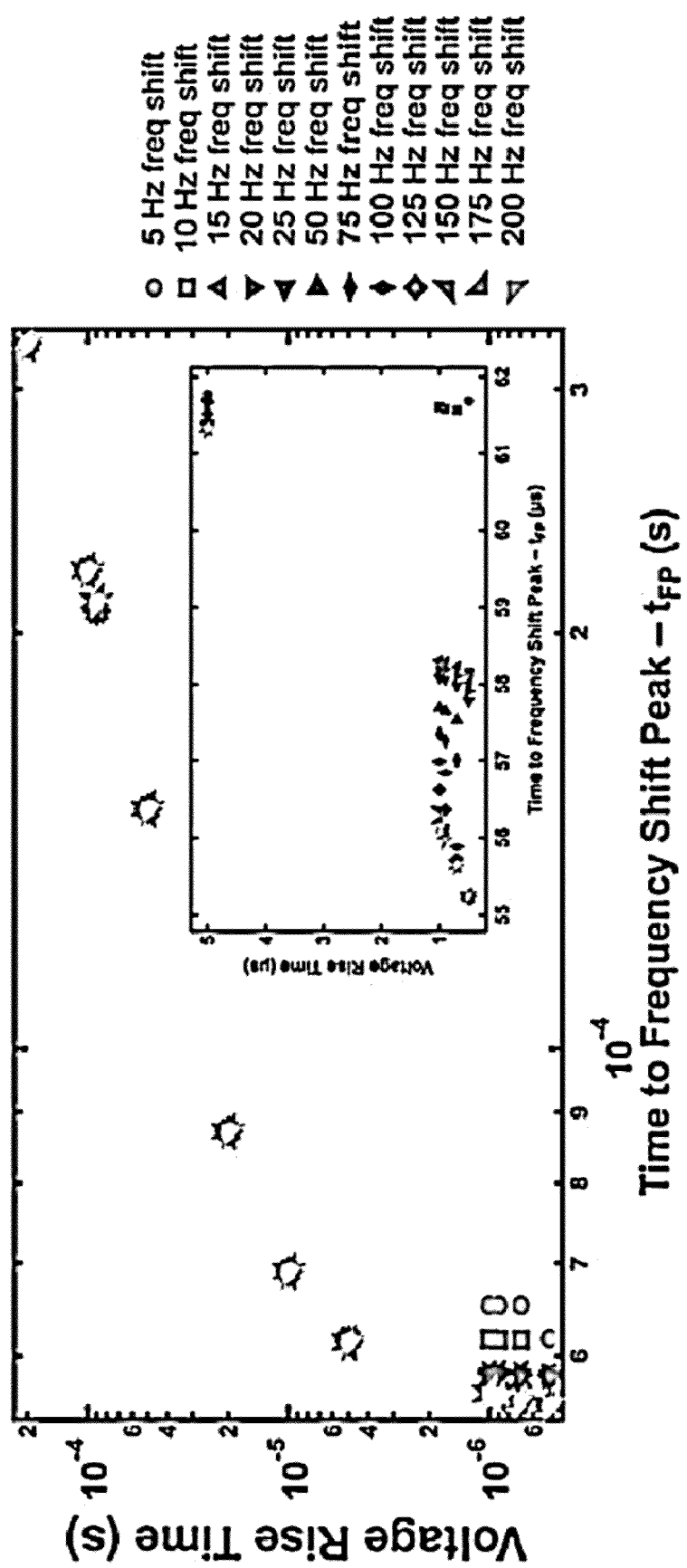

Factors (1) and (2) cannot be controlled as they vary with the experiment, but we can use our simulations to determine how dependent FF-trEFM is on these effects. In FIGS. 11A and 11B we explore how the $t_{FP}$ varies with rise time either by changing the electrostatic force $F_e$ values (top) or force gradient $dF_e/dz$ values (bottom) using our modified-DDHO simulation. Note that here we are displaying the data with voltage rise time on the y-axis. When we vary the electrostatic force, we see that the $t_{FP}$ values only vary below a certain voltage rise time, at ~10 µs. For large force values (20 nN), the resolution cuts off at ~10 µs, and below this point the $t_{FP}$ values do not follow an expected monotonic trend. At lower force values (<1 nN), the monotonicity is preserved even in the sub-1 µs regime, as is more clearly observed in the linear-scale inset.

FIGS. 11A and 11B illustrate the effect of electrostatic force and force gradient on sub-cycle time resolution. Simulated data using root exponential voltage pulses by sweeping either (A) the electrostatic force or (B) the net frequency shift (effectively the change in electrostatic force gradient). (A) Changing the force plays a significant role in the $t_{FP}$ values in the sub-10 µs regime. (B) Changing the frequency shift affects the proportionality between $t_{FP}$ values at a given sub-10 µs level; as the frequency shift increases, the larger the difference in $t_{FP}$ between two consecutive voltage rise times. Bolded values indicate typical experimental conditions on a PFB:F8BT blend. Insets show the sub-5 µs data on a linear scale.

In FIG. 11B, we vary the change in electrostatic force gradient $\Delta\partial F/\partial z$ by changing the net frequency shift, with the total shift being proportional to how much the electrostatic force gradient affects the spring constant. Below ~5 µs, the extent of the frequency shift determines the behavior in $t_{FP}$. The larger the change in resonance frequency (the larger $\Delta\partial F/\partial z$), the greater the change in $t_{FP}$ with respect to changes in the voltage signal rise time and the more monotonic its behavior.

The force and force gradient counter each other. Raising the lift height or using very sharp tips would reduce $F_e$ but would also reduce $\Delta\partial F/\partial z$. The simulations may explain the roll-off in the voltage pulse data on Au because on metals, $F_e$ is upwards of 10 nN and therefore more of an issue. For dielectric samples like the OPV samples, these values are often sub-nN (see Table 1) and therefore may exhibit even better time-resolution than reported here.

While illustrative embodiments have been illustrated and described, it will be appreciated that various changes can be made therein without departing from the spirit and scope of the invention.

The invention claimed is:

1. An apparatus, comprising:
a cantilever configured to measure the response of a sample adjacent the cantilever;
a drive controller configured to oscillate the cantilever at a drive frequency;
a detector in communication with the cantilever, which is configured to measure the response of the cantilever;
an excitation signal generator configured to apply a perturbation to the sample; and
a triggering circuit configured to coordinate the response of the cantilever and the perturbation such that the perturbation occurs at the about the same position in the cantilever oscillation cycle.

2. The apparatus of claim 1, further comprising a system controller in communication with the drive controller, said system controller being configured to control the drive frequency applied by the drive controller.

3. The apparatus of claim 2, wherein the system controller is in communication with the triggering circuit.

4. The apparatus of claim 2, wherein the system controller is in communication with the detector.

5. The apparatus of claim 1, wherein the cantilever is an atomic force microscopy (AFM) cantilever, and wherein the detector is in optical communication with the cantilever through an optical beam reflected off the cantilever and into the detector, wherein said detector is an optical detector.

6. The apparatus of claim 1, wherein the excitation signal generator is selected from the group consisting of a light source, a magnetic source, an electrical source, a radio frequency source, and combinations thereof.

7. The apparatus of claim 1, wherein the excitation signal generator and the cantilever are both configured to be in communication with a first location on the sample.

8. The apparatus of claim 1, wherein the excitation signal generator generates a perturbation that is transient or time-varying.

9. The apparatus of claim 1, wherein the apparatus does not utilize a feedback loop to regulate cantilever motion following the perturbation.

10. The apparatus of claim 1, further comprising a positioning controller configured to position the cantilever in relation to the sample.

11. A time-resolved microscopy method for measuring the response of a sample to a perturbation, using a cantilever positioned adjacent a first location of the sample, the method comprising the steps of:
(a) applying the perturbation to the sample at a first time;
(b) measuring the motion of the cantilever in response to the effect of the perturbation on the sample for a predetermined first length of time, to provide a deflection signal, without imposing feedback to regulate cantilever motion following the perturbation; and
(c) determining from the deflection signal the time-domain properties of the effect of the perturbation on the first location of the sample.

12. The method of claim 11, wherein the cantilever is an oscillating cantilever vibrated at a steady-state frequency prior to the perturbation, and wherein determining the time-domain properties comprises the steps of:
(i) extracting an instantaneous frequency of the cantilever from the deflection signal, to provide a frequency signal for the first length of time;
(ii) identifying within the frequency signal the maximum frequency shift from the steady-state frequency, to provide a frequency peak value at a peak time; and (iii) determining the amount of time intermediate the first time and the peak time, to provide a frequency-shift-peak time that is characteristic of the time-domain characteristics of the effect of the perturbation on the sample at the first location.

13. The method of claim 12, wherein extracting an instantaneous frequency of the cantilever from the deflection signal comprises determining an instantaneous phase of the cantilever from the deflection signal.

14. The method of claim 11, further comprising a step of repeating the steps of applying the perturbation and measuring the motion of the cantilever in response to the effect of the perturbation multiple times at the first location using the same magnitude of perturbation and averaging the multiple deflection signals to provide an averaged deflection signal, wherein the averaged deflection signal is used as the deflection signal when determining the time-domain properties of the effect of the perturbation on the first location of the sample.

15. The method of claim 14, wherein the cantilever is an oscillating cantilever and wherein repeating the steps of applying the perturbation and measuring the motion of the cantilever in response to the effect of the perturbation multiple times comprises coordinating the position of the cantilever and the perturbation such that the perturbation occurs at about the same position in the cantilever oscillation cycle.

16. The method of claim 11, further comprising rastering the cantilever across the sample to multiple locations while determining, from the deflection signal at each of the multiple locations, the time-domain properties of the effect of the perturbation on the multiple locations of the sample, to provide an image of the sample.

17. The method of claim 11, wherein the perturbation is selected from the group consisting of a light signal, a magnetic signal, an electrical signal, a radio frequency pulse signal, and combinations thereof.

18. The method of claim 1, wherein the perturbation is transient or time-varying.

\* \* \* \* \*